(12) United States Patent
Goodman

(10) Patent No.: US 7,385,591 B2
(45) Date of Patent: Jun. 10, 2008

(54) OUT-OF-VOCABULARY WORD DETERMINATION AND USER INTERFACE FOR TEXT INPUT VIA REDUCED KEYPAD KEYS

(75) Inventor: Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1275 days.

(21) Appl. No.: 09/823,585

(22) Filed: Mar. 31, 2001

(65) Prior Publication Data

US 2003/0011574 A1    Jan. 16, 2003

(51) Int. Cl.
*H03K 17/94* (2006.01)
*G06F 3/02* (2006.01)

(52) U.S. Cl. .............. 345/172; 345/168; 345/169; 341/22

(58) Field of Classification Search ........ 345/156–173; 341/22–28
See application file for complete search history.

(56) References Cited

U.S. PATENT DOCUMENTS

| | | | | |
|---|---|---|---|---|
| 5,818,437 | A | 10/1998 | Grover et al. | 345/326 |
| 5,953,541 | A | 9/1999 | King et al. | 395/887 |
| 6,011,544 | A | 1/2000 | Sato | 345/168 |
| 6,782,357 | B1 | 8/2004 | Goodman et al. | 704/9 |
| 2002/0180689 | A1 | 12/2002 | Venolia | 345/156 |
| 2002/0188448 | A1 | 12/2002 | Goodman et al. | 704/254 |
| 2003/0023420 | A1 | 1/2003 | Goodman | 704/1 |

OTHER PUBLICATIONS

F. Jelinek, "Self Organized Language Modeling for Speech Recognition", Language Processing for Speech Recognition, pp. 450-503.
K. Seymore et al., "Scalable Backoff Language Models", In Proc. ICSLP, vol. 1, pp. 232-235, Philadelphia, 1996.
Stolcke, "Entropy-based Pruning of Backoff Language Models", Proc. DRAPA News Transcription and Understanding Workshop, pp. 270-274, Lansdowne, VA.
Chen et al., "An Empirical Study of Smoothing Techniques for Language Modeling", TR-10-98, Computer Science Group, pp. 1-64, Harvard University, 1998.
Lehikoinen et al., "BinScroll: A Rapid Selection Technique for Alphanumeric Lists", CHI 2000, pp. 261-262, Apr. 1-6, 2000.
Ahlberg et al., "The Alphaslider: A Compact and Rapid Selector", Proc. CHI 94, p. 365-371.

*Primary Examiner*—David L. Lewis
(74) *Attorney, Agent, or Firm*—Westman, Champlin & Kelly, P.A.

(57) ABSTRACT

Out-of-vocabulary (OOV) word determination corresponding to a key sequence entered by the user on a (typically numeric) keypad, and a user interface for the user to select one of the words, are disclosed. A word-determining logic determines letter sequences corresponding to the entered key sequence, and presents the sequences within the user interface in which the user can select one of the letter sequences as the intended word, or select the first letter of the intended word. When letters are selected, the word-determining logic determines new letter sequences, consistent with the key sequence and the selected letters, and presents the new letter sequences. The user again selects one of the letter sequences as the intended word, or selects the second letter of the intended word. This process is repeated until the user has selected the intended word.

45 Claims, 12 Drawing Sheets

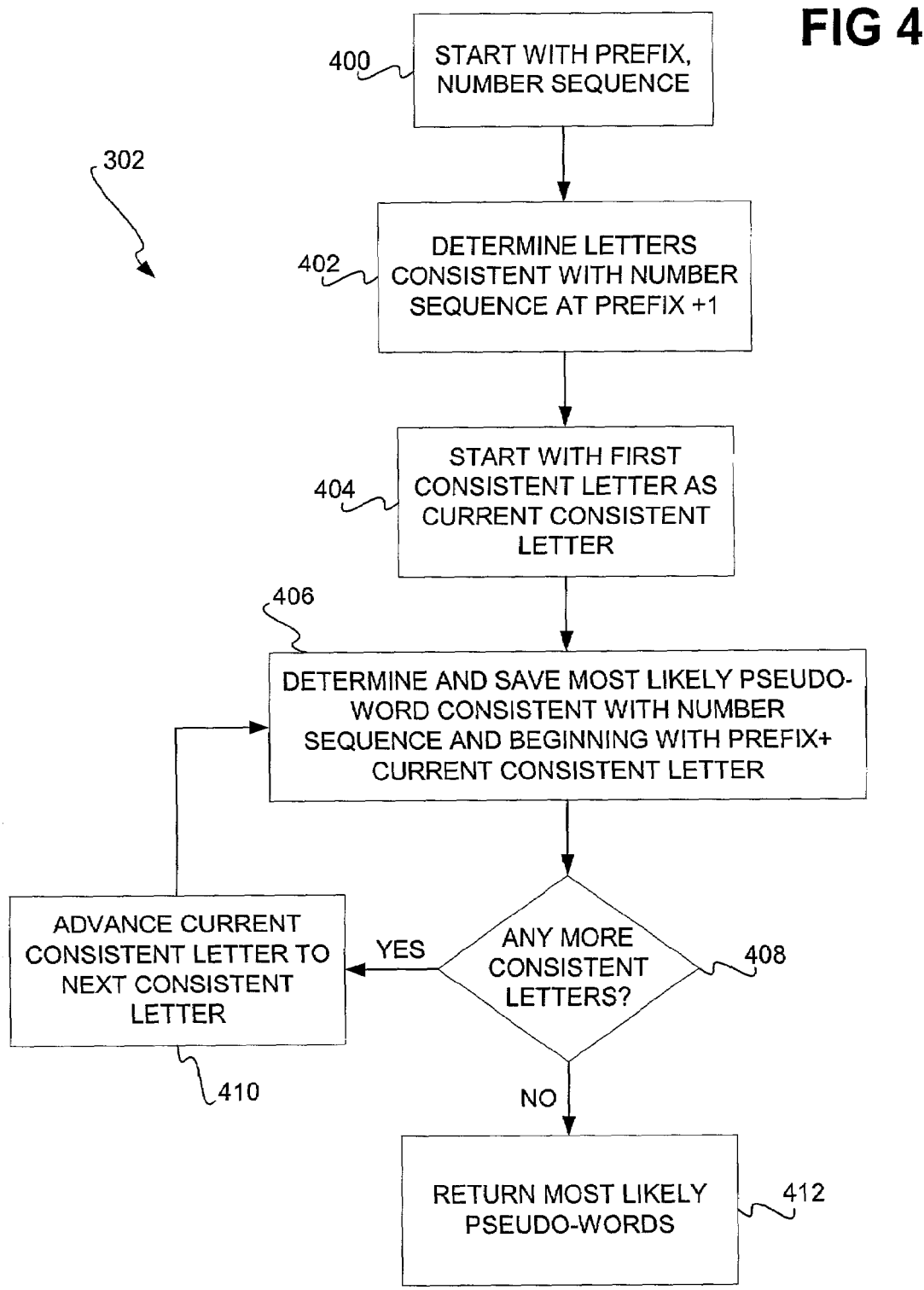

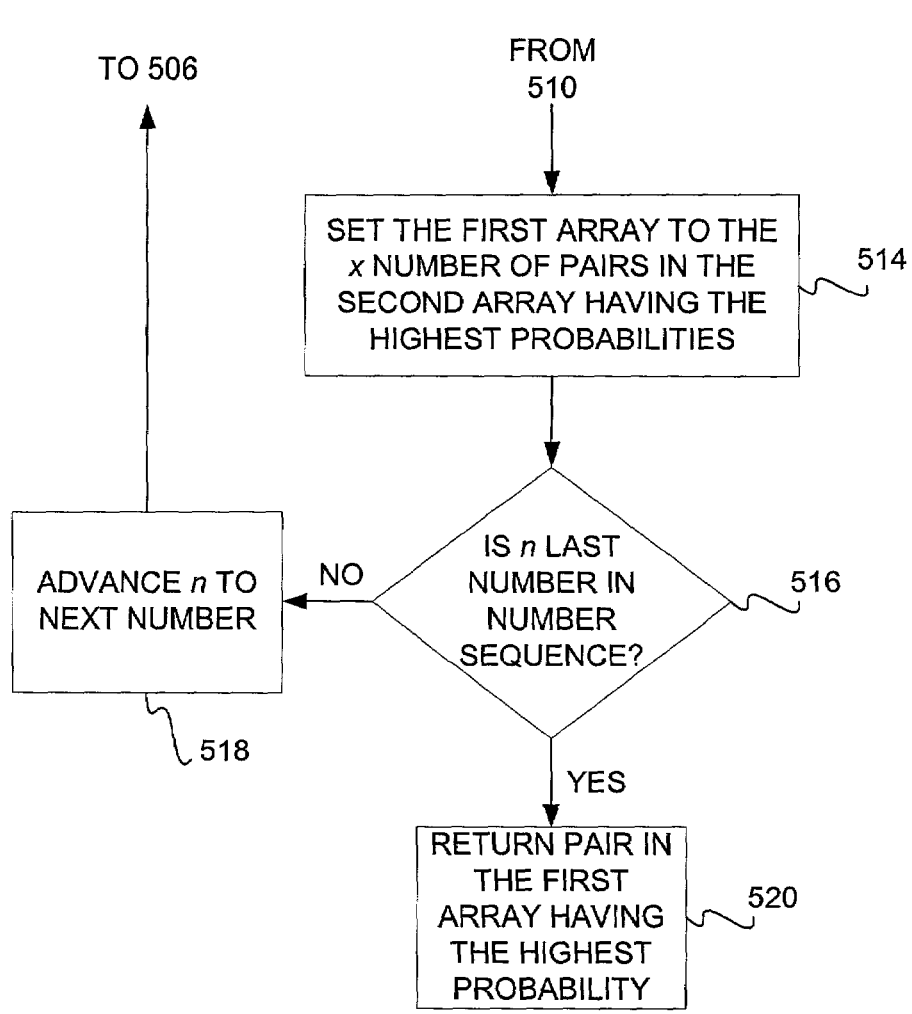

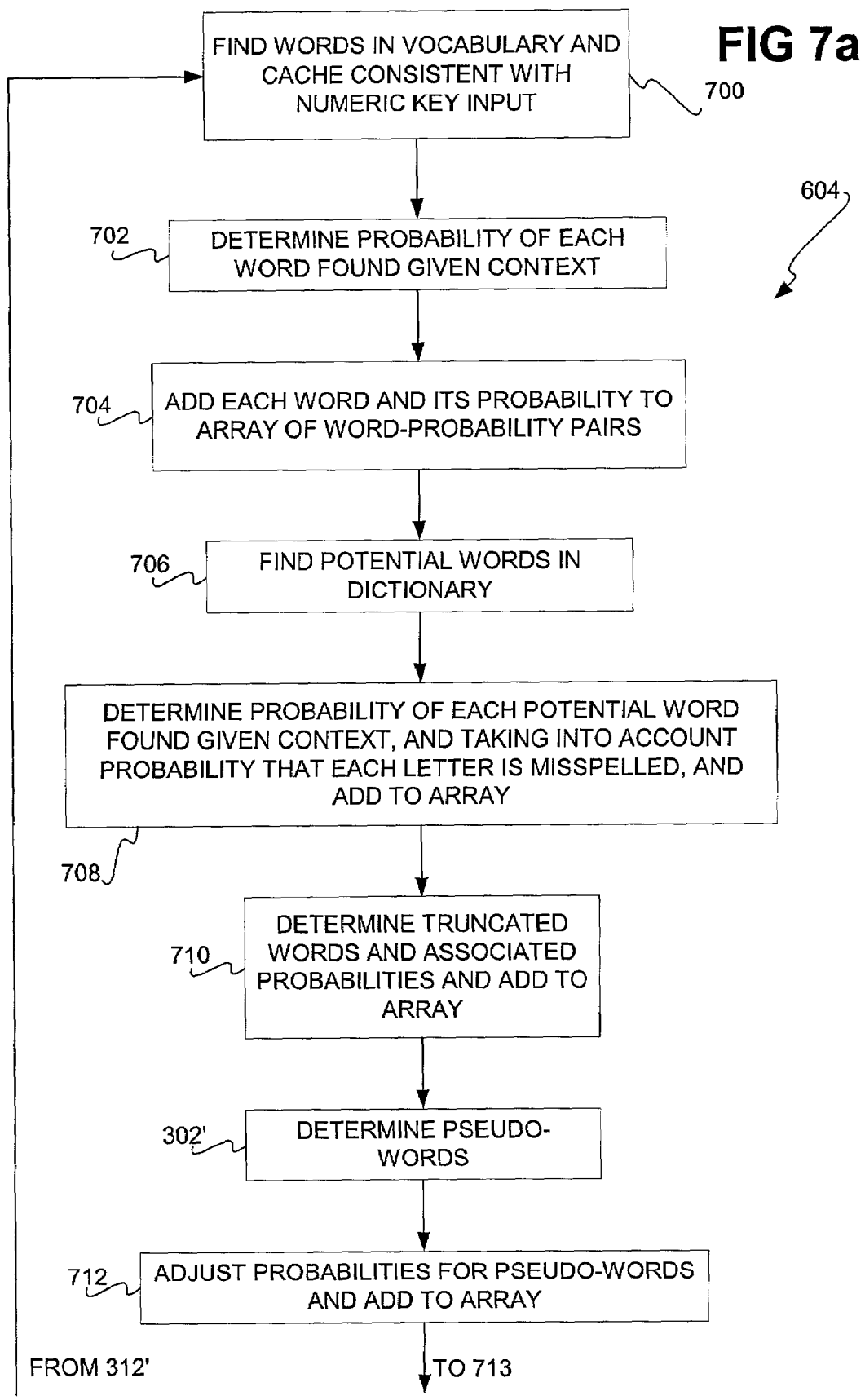

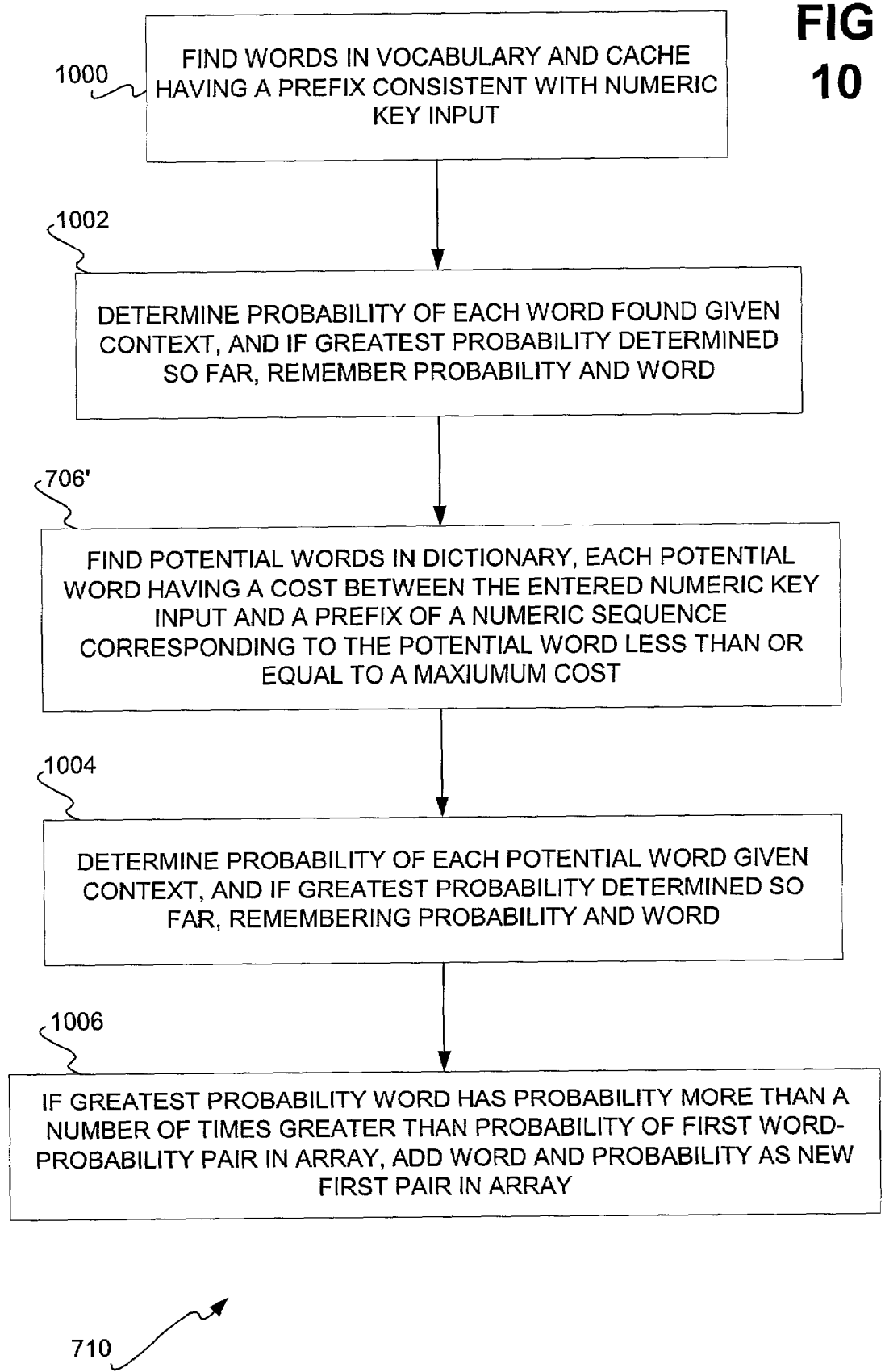

OUT-OF-VOCABULARY WORD DETERMINATION AND USER INTERFACE FOR TEXT INPUT VIA REDUCED KEYPAD KEYS

FIELD OF THE INVENTION

The invention relates generally to text input using a reduced keypad, such as a numeric keypad, and more particularly to determining out-of-vocabulary words, and presenting a user interface to allow the user to select one of the words, for text input entered using this keypad.

BACKGROUND OF THE INVENTION

Mobile phones, and other devices having only a limited set of input keys, have become increasingly popular. While the numeric keys of a mobile phone are adequate for entering phone numbers and other number sequences, they are difficult to use for entering text. A standard keyboard has keys for both letters and numbers, whereas the numeric keys of a mobile phone have no intuitive way by which to enter text. Text may need to be entered on such devices, for example, to associate a name with a phone number in an address book. Since mobile phones and other such devices are becoming more popular for accessing the Internet, such as to browse web sites and send and receive email, this limitation will likely become increasingly acute in the future.

Currently, there are two common ways to achieve text input using numeric keys, a multiple-tap approach, and a single-tap approach. With the multiple-tap approach, a user presses a numeric key a number of times to enter the desired letter, where most of the numeric keys are mapped to three or four letters of the alphabet. For example, the two key is usually mapped to the letters A, B, and C. If the user presses the two key once, the letter A is entered. If the user presses the two key twice, the letter B is entered, and if the user presses the two key three times, the letter C is entered. Pauses between entry of successive letters of a word are sometimes necessary so that the device knows when to advance the cursor to the next letter-entry position. For example, to enter the word "cab," the user presses the two key three times to enter the letter C, pauses, presses the two key once to enter the letter A, pauses again, and presses the two key twice to enter the letter B. To enter numbers, symbols, or switch between upper- and lower-case letters, typically other keys that are present on numeric keypads, such as the pound ("#") and asterisk ("*") keys, among other keys, are mapped for these purposes.

While the multiple-tap approach is usable in that users can enter any word using only the numeric keys, it is disadvantageous for quick and intuitive text entry. A word such as "cab" that only requires three key presses on a standard keyboard, one for each letter, requires six key presses on numeric keys using the multiple-tap approach. As compared to using a standard keyboard, using numeric keys with the multiple-tap approach to achieve text entry means that the user presses many keys even for short messages. Furthermore, errors can be frequent. For example, if the user intends to enter the letter B, but pauses too long between the first and the second presses of the two key, two letters A will be entered instead. The device in this case interprets the pause as the user having finished with the current letter entry, an A, and proceeds to the next letter-entry position, where it also enters an A.

Another approach to text entry using numeric keys is the single-tap-dictionary approach, an approach popularized by a company called Tegic. Under the single-tap approach, the user presses the numeric key associated with the desired letter once, even though the numeric key may be mapped to three or four different letters. When the user is finished entering a number sequence for a word, the device attempts to discern the word that the user intended to enter, based on the number sequence. Each number sequence is mapped to a common word that corresponds to the sequence. For example, the number sequence 43556 can potentially correspond to any five-letter word having a first letter G, H, or I, since the four key is usually mapped to these letters. Similarly, the sequence potentially corresponds to any five-letter word having a second letter D, E, or F, a third and fourth letter selected from the letters J, K, and L, and a fifth letter M, N, or O, since the three, five, and six keys are usually mapped to these respective letters. However, because the most common five-letter word corresponding to the number sequence 43556 is the word "hello," the single-tap approach may always enters this word when the user presses the four, three, five, five, and six keys in succession to input this number sequence.

The single-tap approach has advantages over the multiple-tap approach, but presents new disadvantages. Advantageously, the single-tap approach ensures that the user only has to press the same number of keys as the number of letters in a desired word. For example, the multiple-tap approach requires the user to press the two key six times to enter the word "cab." Conversely, the single-tap approach potentially only requires the user to press the two key three times to enter this word, assuming that the number sequence 222 is mapped to the word "cab." Therefore, the single-tap approach is more key-efficient than the multiple-tap approach for text entry using numeric keys. It is as key-efficient as using a standard keyboard that has a single key for each letter.

The single-tap approach is disadvantageous in that the word mapped to a given number sequence may not be the word the user intended to enter by inputting the sequence. For example, the numeric key sequence 7333 corresponds to both the words "seed" and "reed." Because only one word is mapped to each numeric key sequence, the word "seed" may be entered when the user keys in the numeric key sequence 7333, whereas the user may have intended to enter the word "reed." The single-tap approach is primarily useful where there is only one unique word for a given numeric key sequence, or, if there are a number of words for a given sequence, when the user wishes to input the most common word associated with the sequence. For entry of uncommon words corresponding to number sequences to which words that are more common also correspond, the approach is less useful. The single-tap approach is also not useful for the entry of all but the most common proper names, and scientific, legal, medical, and other specialized terms, all of which will not usually be mapped to number sequences. Where the word mapped by the single-tap approach is not the intended word, text entry may revert back to the multiple-tap approach, or to an error-correction mode. Ultimate text entry of the intended word may then require more keystrokes than if the user had started with the multiple-tap approach.

The problem of a given number sequence mapping to multiple words is referred to as the ambiguity limitation of the single-tap approach. Some prior art approaches exist to overcome this limitation by attempting to disambiguate the intended word when the user enters a number sequence that corresponds to more than one word. One disambiguation approach is to show the user a number of different words that correspond to the entered number sequence, in order of decreasing frequency of use—that is, in decreasing order of how common the different words are. The user then selects a word from the list. This approach is described in detail in U.S. Pat. No. 5,953,541, issued on Sep. 14, 1999. The primary disadvantage to this disambiguation approach is that after the user has entered the number sequence, he or she is forced to expend additional effort reviewing the presented list of words, and selecting the desired word from the list. While this may be better than forcing the user back into a multiple-tap approach to reenter the intended word with additional keystrokes, it still can considerably delay text entry using numeric keys.

An improvement to this disambiguation approach is described in detail in U.S. Pat. No. 6,011,554, issued on Jan. 4, 2000, and which is a continuation-in-part of the U.S. patent application that issued as U.S. Pat. No. 5,818,437 on Oct. 6, 1998. Under the improved disambiguation approach, the word corresponding to the entered number sequence that has the highest frequency of use is automatically selected by default when the user begins to enter a new number sequence using the numeric keys. This is advantageous because, if the user's intended words are those having the highest frequency of use for the entered number sequences, the user does not have to select them from presented lists. However, at best occasionally, and at worst frequently, the user still has to select the desired word from a list, when the desired word is not the word with the highest frequency of use for the entered number sequence. This means that text entry delays are still inevitable even with this improved disambiguation approach.

Perhaps the primary disadvantage to either the original disambiguation approach, or the improved disambiguation approach, is that the order of words presented in the list intrinsically depends on only the current number sequence entered by the user. The described disambiguation approaches only consider the frequency of use of the words that correspond to the current number sequence in ordering the list of words from which the user can select a desired word. For a given number sequence entered, the list of words presented to the user is always the same. Therefore, using one of the previously described examples, when the user enters the number sequence 7333, if the word "seed," which corresponds to this number sequence, has a higher frequency of use than the word "reed," which also corresponds to the sequence, the former word is always displayed in the list ahead of the latter word. The list of words does not take into account that in some situations the word "reed" is a better choice than the word "seed." As an example, if the user is entering the sentence "The first reed is shorter than the second reed," the device will present the user with the word "seed" for both the first and the second time the user enters in the sequence 7333 for the intended word "reed." The device does not discern that if the user has most recently selected the word "reed" for the sequence 7333, the user more likely wishes to enter this word, and not "seed," when entering the sequence again.

Another disadvantage of these approaches is that they do not take into account the user making a mistake when entering in a word using the numeric keys. For example, the user may have intended to enter the word "relief" using the single-tap approach. The user should have entered the number sequence 735433, but instead entered the number sequence 735343, which corresponds to the incorrect spelling "releif" of this word. When the current single-tap approaches encounter the number sequence 735343, they may map the number sequence to an actual word that has this number sequence. Because the single-tap approach is an ambiguous manner by which to enter words, the number sequence may correspond to other words, besides the incorrect spelling of the word "relief." For example, the number sequence 735343 corresponds to an alternative name Peleid for the Greek mythological hero Achilles. Even though it is more likely that the user had intended to enter the word "relief," and just misspelled the word, the single-tap approach, if the word "Peleid" is in its dictionary, is likely to propose this word as the word the user had intended to enter.

Furthermore, current spell checking approaches, such as those used in word processing programs, do not operate well in the ambiguous environment of text entry using numeric keys. These spell checking approaches operate on the letters of the word, and therefore most assume, at least implicitly, that the word has been entered using a standard keyboard having a unique key for each letter of the alphabet. As an example, sophisticated spell checking approaches may determine that when the user has entered the nonsensical word "xome," he or she really meant to enter the word "come." This is because the X key is next to the C key in a standard keyboard, such that the user may have accidentally, and easily, pressed the latter key instead of the former key.

These sophisticated spell checking approaches do not carry over very well to text input entered using numeric keys via the single-tap approach. For example, the non-word "xome" has the number sequence 9663, whereas the word "come" has the number sequence 2663. Determining that the user had entered the word "come" instead of the word "xome" in this case is likely incorrect, since the 2 key is far away from the 9 key on most numeric keypads. For example, the user is more likely to have intended to enter the number sequence 8663, corresponding to the word "tome." Furthermore, the single-tap approach in the first instance is likely to map the entered number sequence 9663 to the common word "wood," such that the spell checking approach would never even be given the opportunity to provide alternative words.

As has been indicated, another disadvantage to the prior art single-tap approaches is that the user expends an inordinate effort to enter words not in the vocabulary being used. For example, the user may intend to enter the word "iolfen," and therefore enters the number sequence 465336 using the numeric keys. However, this number sequence may correspond to the word "golden" in the vocabulary being used. When presented with the word "golden," the user is likely to have to revert to a multiple-tap approach to enter the intended word "iolfen." As a result, the user expends considerable effort to enter the desired word. First, the user uses the single-tap approach, entering the number sequence 465336. When the desired word "iolfen" is not presented, then the user must re-enter the word using the multiple-tap approach. Ultimate text entry of the intended word may thus require more keystrokes than if the user had started with the multiple-tap approach.

Furthermore, the improved disambiguation approaches that have been described are not useful in situations where the intended word of the user is not in the vocabulary being used. Referring to the example of the previous paragraph, when the user enters the number sequence 465336, the improved disambiguation approaches may have in their vocabulary two words that map to this sequence, the word "golden," and the word "holden." The word "golden" may have a higher frequency of use than the word "holden," and therefore is selected by default. The user is then given the opportunity to alternatively select the word "holden." The intended word "iolfen," if not mapped to the number sequence 465336, will not be presented to the user as one of the choices. The improved disambiguation approaches, in other words, are not useful in situations where the user enters a number sequence for a particular intended word that is not mapped to the number sequence in the vocabulary. In this situation, the user again is likely to have to reenter the word using the multiple-tap approach. For these reasons, as well as other reasons, there is a need for the present invention.

SUMMARY OF THE INVENTION

The invention relates to determining out-of-vocabulary (OOV) words corresponding to a sequence on a reduced keypad, such as a number sequence entered by the user on a numeric keypad, as well as a user interface to enable the user to select one of the words. Most of the keys are mapped to three or four letters. For example, on a numeric keypad, the two key is usually mapped to the letters A, B, and C. The user uses a single-tap approach to enter a number sequence corresponding to an intended word. A word-determining logic determines letter sequences corresponding to the number sequence, and presents the sequences within a user interface in which the user can select one of the letter sequences as the intended word, or select the first letter of the intended word. When letters are selected, the word-determining logic determines new letter sequences, consistent with the number sequence and the selected letters, and presents the new letter sequences. The user is then afforded the opportunity to again select one of the letter sequences as the intended word, or select the second letter of the intended word. This process is repeated until the user has selected the intended word from the letter sequences presented.

For example, the user may intend to enter the word "iel," which has a number sequence 435. The word-determining logic determines and presents three letter sequences, "gel," "hek," and "ifk," which are all consistent with the number sequence 435. Because the intended word is not in this list of sequences, the user instead accepts the first letter of the sequence "ifk." The word-determining logic determines three new letter sequences, "iel," "ifj," and "idl." Each of these letter sequences is consistent with the first letter that has been accepted by the user, the letter I, as well as with the number sequence 435. Because the intended word is now in the list of sequences, the user selects the sequence "iel" as the intended word.

The out-of-vocabulary word determination and user interface of the invention is advantageous in situations where text entry is accomplished via numeric keys. The user never has to resort to the multiple-tap approach to enter a word that is not in the vocabulary, or dictionary, being used. Rather, the user only has to repeatedly select letters of the intended word, from the letter sequences presented to the user, until the intended word is displayed. The result is that entry of OOV words, such as specialized legal and medical terms, and proper names, are quickly entered using numeric keys.

Methods and devices of varying scope are encompassed by the invention. Other aspects, embodiments and advantages of the invention, beyond those described here, will become apparent by reading the detailed description and by referencing the drawings. The invention is substantially described with respect to a numeric keypad. However, the invention itself is applicable to any set of reduced keys, referred to generally as a reduced keypad. A reduced keypad is defined non-restrictively as a number of keys, where each of one or more of the keys is mapped to, or corresponds to, more than one letter. For example, a numeric keypad is a reduced keypad, because typically most of the number keys are mapped to three or four different letters.

BRIEF DESCRIPTION OF THE DRAWINGS

FIG. 4 is a flowchart of a method showing how one embodiment implements the OOV word determination of FIG. 3 in more detail.

FIGS. 5a and 5b are flowcharts of a method showing how one embodiment implements the OOV word determination of FIG. 4 in more detail.

FIGS. 7a and 7b are flowcharts of a method showing how one embodiment implements the word determination of FIG. 6 in more detail.

FIG. 10 is a flowchart of a method showing how one embodiment implements the partial word determination of FIGS. 7a and 7b in more detail.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

Figure 1:
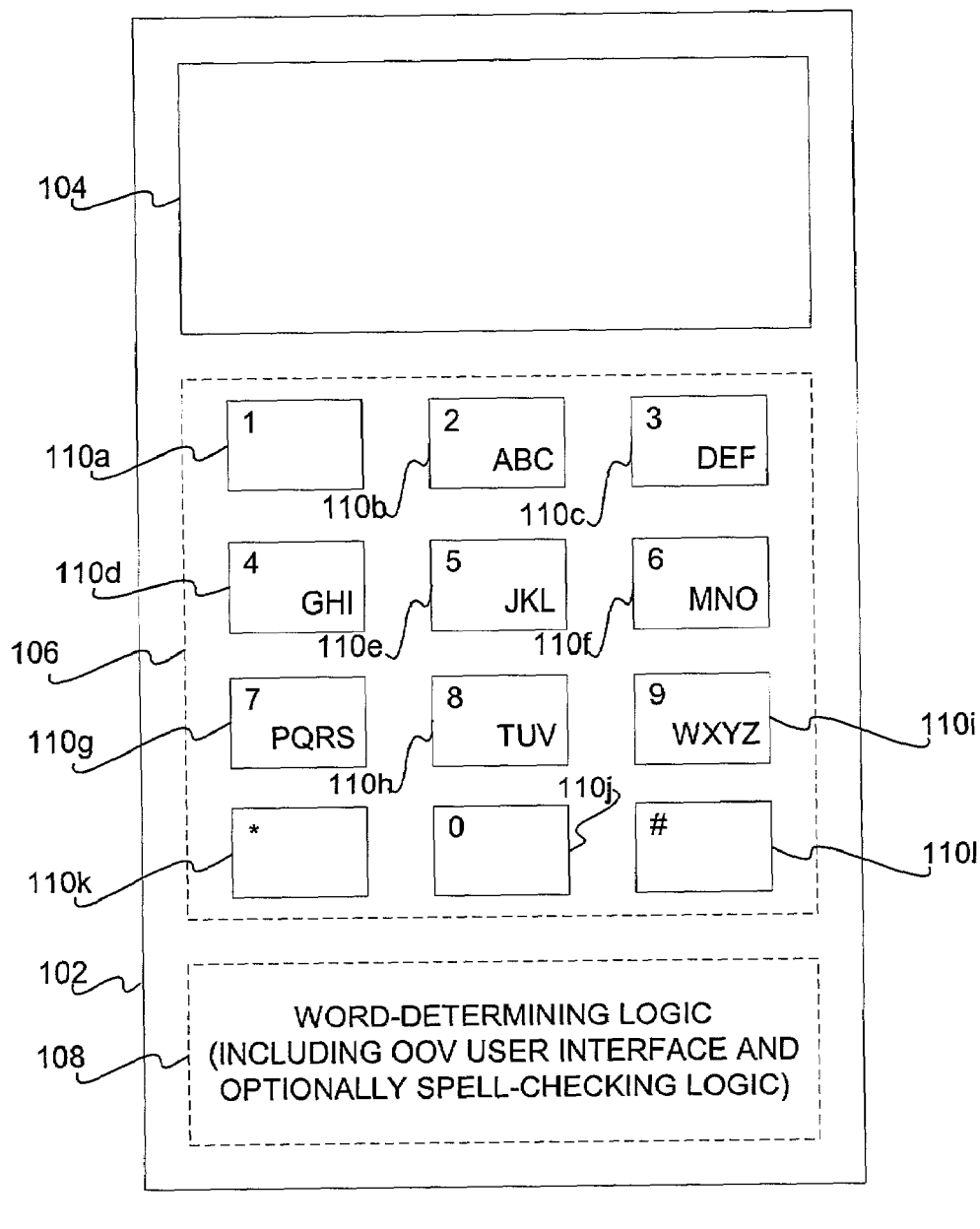
FIG. 1 is a diagram of an example device apparatus according to an embodiment of the invention.

FIG. 1 is a diagram 100 showing an example device 102 according to an embodiment of the invention. The device 102 can be a telephone, such as a mobile phone, a cordless phone, a corded phone, a radio phone, or another type of telephone.

The device 102 can also be a device other than a telephone. For example, the device 102 may be a computer, such as a desktop computer, a laptop computer, a handheld computer, or another type of computer. As another example, the device 102 may be a handheld device such as a personal-digital assistant (PDA) device, a remote control, a pager, or another type of device.

The device 102 has at least a display 104, a (typically numeric) keypad 106, and a word-determining logic 108.

The device 102 may have other components besides those shown in FIG. 1. The display 104 is used to convey information visually to the user. This information can include visual feedback regarding the entry the user is effecting by pressing keys on the numeric keypad 106. The display 104 is typically a small, flat display, such as a liquid crystal display (LCD). However, the display 104 can also be a larger display, such as a cathode-ray tube (CRT) display, or another type of larger display, such as a larger LCD or other flat-panel display (FPD).

The numeric keypad 106 includes a number of numeric keys, as well as other types of keys. In general, the numeric keypad 106 is distinguished from a standard keyboard in that it does not have a unique key for each letter. As such, the numeric keypad 106 is referred to as having a reduced or a limited set of keys. In particular, the numeric keypad 106 has the following number keys: a one key 110a, a two key 110b, a three key 110c, a four key 110d, a five key 110e, a six key 110f, a seven key 110g, an eight key 110h, a nine key 110i, and a zero key 110j. The numeric keypad 106 also has an asterisk key 110k, and a pound sign key 110l. The numeric keypad 106 may also have other specialized keys beyond those shown in FIG. 1, or fewer keys than those shown in FIG. 1. The layout of the keys of the numeric keypad 106 as shown in FIG. 1 is typical of that found on most telephones, such as mobile phones. The keys of the numeric keypad 106 may be real, physical keys, or virtual, soft keys displayed on the display 104, where the display 104 is a touch-sensitive screen.

All of the number keys of the numeric keypad 106, except for the one key 110a and the zero key 110j, correspond to three or four letters of the alphabet. The two key 110b corresponds to the letters A, B, and C. The three key 110c corresponds to the letters D, E, and F. The four key 110d corresponds to the letters G, H, and I. The five key 110e corresponds to the letters J, K, and L. The six key 110f corresponds to the letters M, N, and O. The seven key 110g corresponds to the letters P, Q, R, and S. The eight key 110h corresponds to the letters T, U, and V. Finally the nine key 110i corresponds to the letters W, X, Y, and Z. That a given number key corresponds to three or four specific letters means that the number key is pressed one or more times by the user to signify input of any of the specific letters. Punctuation characters such as ~!@#$?*()_+-+\|; :'",./<>? may be included either on unused keys, such as the one key 110a, or may be included also on the other number keys, along with the letters.

In the context of the invention, the user uses the numeric keys of the numeric keypad 106 to enter a number sequence corresponding to a word using the single-tap approach. For each letter the user wishes to enter, the user presses the numeric key corresponding to the letter. For example, to enter the word "hello," the user presses the four key 110d, the three key 110c, the five key 110e twice, and the six key 110f, in succession. Because the number sequence entered, 43556, may correspond to other words than the word "hello," the intended word is ambiguous. The device 102 therefore employs a word-determining logic 108 to disambiguate the word. The logic 108 is designed to determine the word or words corresponding to numeric key input entered by the user on the numeric keypad 106.

The logic 108 can make this determination based on the context of the numeric key input. The logic 108 examines the words, or their corresponding number sequences, that have already been entered to the left and/or the right of the current numeric key input to assist in determining what word the user intended to enter with the current numeric key input. The logic 108 may display the results of its determination on the display 104. The logic 108 uses in general a machine learning approach to determine the word corresponding to the current numeric key input based on the context. The word-determining logic 108 can be implemented as a computer program stored on a computer or machine-readable medium such as a memory, and executed by a processor.

The word-determining logic 108 may also include a spell-checking logic. The spell-checking logic corrects spelling errors given the unique nature of reduced-key text input. For example, a given key combination may correspond to a common misspelling of a word, or the user may have mistyped one number key for another number key. This is a more difficult spelling error to detect than typical spelling errors entered using standard keyboards, because it is more difficult to discern what word the user had intended to enter. The spell-checking logic examines misspellings directly on the number sequence entered, instead of converting the number sequence to a letter sequence, and then examining misspellings. The spell-checking logic may be separate from the word-determining logic 108.

The word-determining logic 108 preferably includes an out-of-vocabulary (OOV) user interface. The OOV user interface enables the user to select words that are not present in the vocabulary used by the logic 108, without resorting to the multiple-tap approach. For example, where the user enters the numeric key input 465336, the word-determining logic 108 may determine that the user intends the word "golden" or the word "holden," depending on the context in which the user has entered the numeric key input. If, however, the user intends the word "iolfen," this word is likely not to ever be selected by the logic 108 if it is not in the vocabulary used by the logic 108. Therefore, the OOV user interface enables the user to select the word "iolfen" without resorting to the multiple-tap approach.

Figure 2:
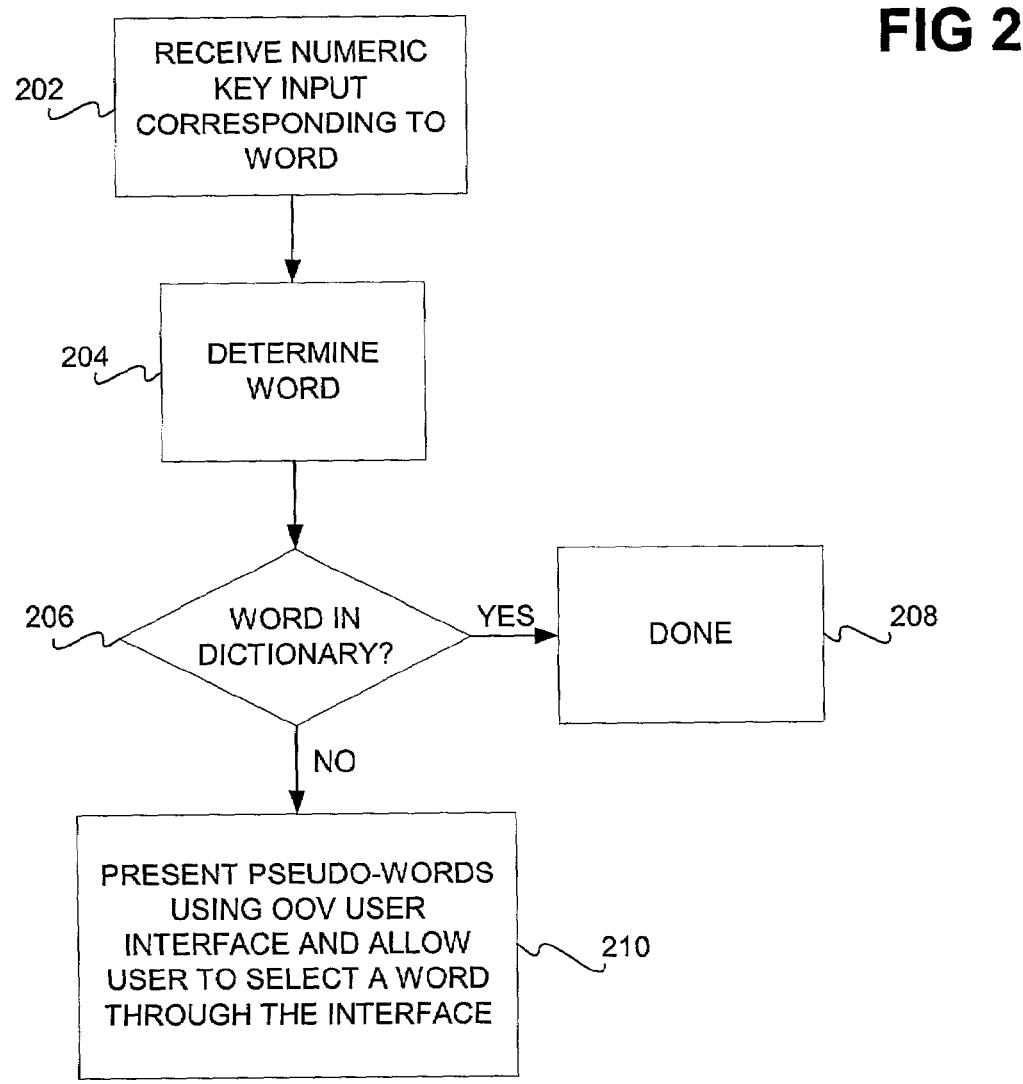
FIG. 2 is a flowchart of a method summarizing the invention.

FIG. 2 shows a flowchart of a method 200 that presents the overall OOV user interface approach followed by one embodiment of the invention. In 202, numeric key input corresponding to a word is received. The input may have a context. In 204, the word is determined, for example, by the word-determining logic 108 of the device 102 of FIG. 1. If the word determined in 204 is in the dictionary, or vocabulary, used by the logic 108, then the method proceeds from 206 to 208, where the method is finished. This is because the OOV user interface logic may not be necessary in all embodiments of the invention where the word corresponding to the entered numeric key input can be unambiguously determined to some degree.

Alternatively, the OOV user interface may always be invoked, for example, to allow the user to select a word that is not in the dictionary, even where the numeric key input entered corresponds to a word that is in the dictionary. The word determination performed in 204 and the resulting checking in 206 may be optional, and the method 200 proceeds directly from 202 to 210. One alternative embodiment that always invokes the OOV user interface is described in a succeeding section of the detailed description.

In 210, if the numeric key input likely corresponds to an OOV word, one or more pseudo-words that may be the word intended by the user are determined. The pseudo-words are more generally sequences of letters that correspond to the numeric key input entered by the user, as received in 202. While these phrases are used somewhat interchangeably, the phrase sequences of letters is more accurate in that it includes sequences of letters that correspond to words, as well as sequences of letters that do not correspond to words.

Conversely, the phrase pseudo-words may be interpreted as only the latter, or as sequences of letters that correspond to words that are not in the dictionary, or vocabulary.

The pseudo-words are presented to the user in 210, and the user is allowed to select the intended word from the sequences of letters presented. If the intended word is not present within the sequences of letters displayed to the user, the user also has the ability to select the first letter of the intended word. This causes the pseudo-words to be redetermined, where the new pseudo-words all have the first letter indicated by the user. If the intended word is still not in the pseudo-words presented to the user, the user repeats this process with the second and subsequent letters, until the intended word is presented to and selected by the user.

Figure 3:
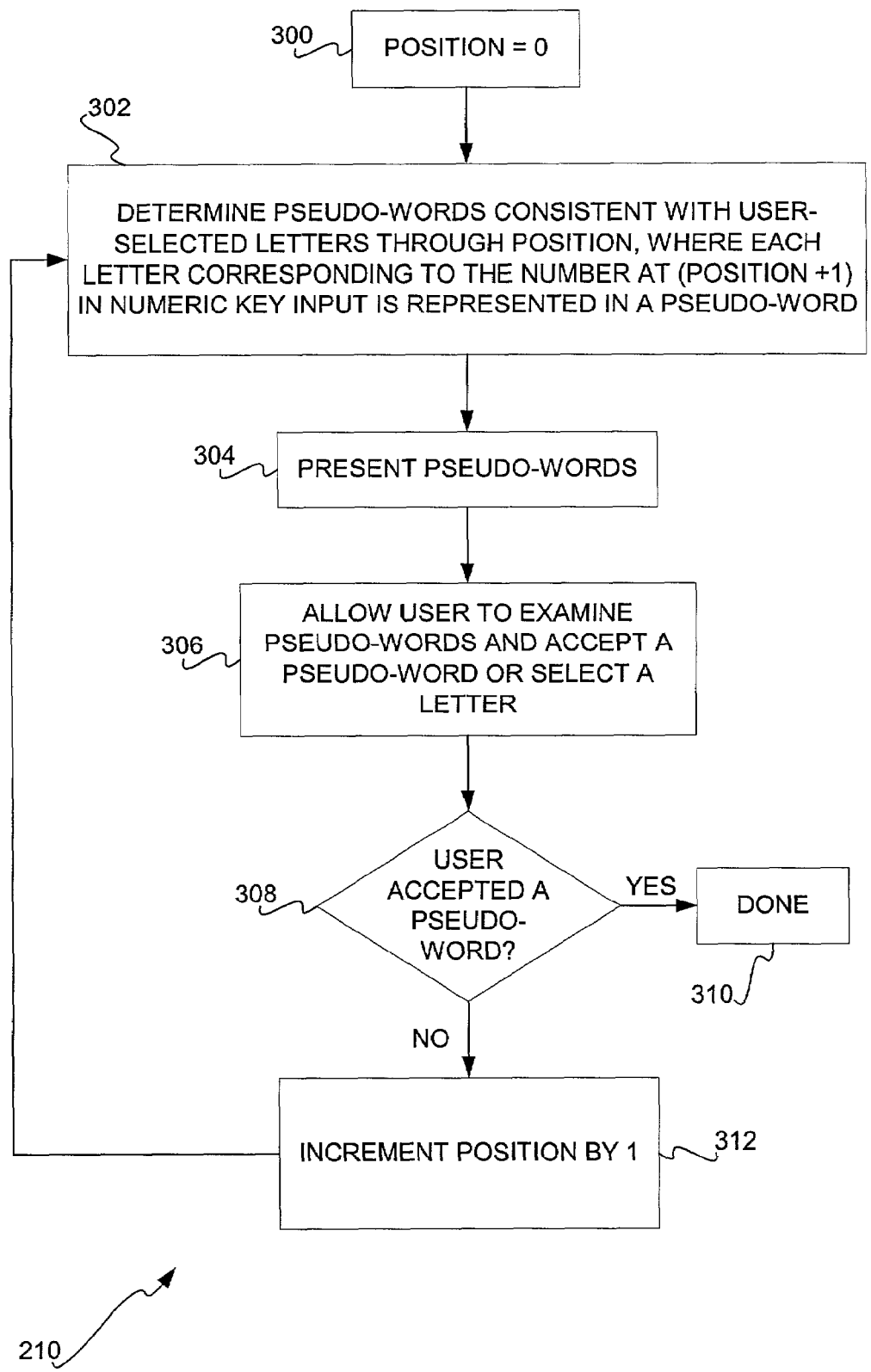
FIG. 3 is a flowchart of a method showing how one embodiment implements the out-of-vocabulary (OOV) word determination and user interface of FIG. 2 in more detail.

This OOV word determination and user interface approach is shown in more detail in the method 210 of the flowchart of FIG. 3. In 300, a position variable is initialized to zero. The position variable indicates the number of letters that the user has accepted. It is initialized to zero because at first the user has not selected any letters of the intended word. In 302, pseudo-words, which are more generally sequences of letters, are determined. The pseudo-words are consistent with the user-selected letters through the position variable. There is also preferably a pseudo-word for each letter corresponding to the number of the entered numeric key input at the position variable plus one. The pseudo-words determined in the first iteration through the method 210 therefore include a pseudo-word for each letter corresponding to the first number of the entered numeric key input. This is because the user has not yet selected any letters, such that the position variable is zero.

As an example, the user may have entered the numeric key input 6883435337 to correspond to the infrequent word "mutegelder." In the first iteration of 302, a pseudo-word is determined for each letter corresponding to the number 6 of the numeric key input. Because the number 6 maps to the letters M, N, and O, these pseudo-words may include the sequences of letters "mtvehelder," "outfielder," which is an actual word, and "nutehelder."

The pseudo-words determined in 302 are then presented to the user in 304. For example, there may be a single entry displaying the most likely pseudo-word corresponding to the entered numeric key input, where the user has the option of viewing the other pseudo-words as well. In 306, the user is given two options when examining the pseudo-words. First, he or she can select one of the pseudo-words as the intended word. If this is the case, the method proceeds from 308 to 310, where it is finished. Second, the user can select the next letter of the intended word. In the case of the first iteration through the method 210, the next letter is the first letter. In general, the next letter is the position within the word denoted by the position variable plus one. Where the user has indicated the next letter of the intended word, the method 210 proceeds from 308 to 312, where the position variable is incremented by one, and the method goes back to 302.

Continuing the previous example, the user, presented with the pseudo-words "mtvehelder," "outfielder," and "nutehelder," selects the letter M of the pseudo-word "mtvehelder," because the intended word is "mutehelder." This causes re-determination of the pseudo-words. The new pseudo-words are consistent with the letters accepted by the user, which in this case means that all the new pseudo-words start with the letter M. The new pseudo-words are also consistent with the entered numeric key input 6883435337. There is a new pseudo-word for each of the letters T, U, and V that correspond to the second number within the entered numeric key input, eight. It is noted that this is required so that if the pseudo-words presented to the user do not include the intended word, the user is able to select the next letter of the intended word.

The new pseudo-words presented to the user may be "mtvehelder," "mutehelder," and "mvudgelder." Because the user's intended word is "mutegelder," the user will in subsequent iterations of the method 214 select the letters U, T, and E of the pseudo-word "mutehelder." At this point, new pseudo-words are determined that are consistent with the accepted letters M, U, T, and E, in that order, and that are also consistent with the numeric key input 6883435337. There is a new pseudo-word for each of the letters G, H, and I that correspond to the fifth number within the entered numeric key input, four. This is because the user has accepted the first four letters, such that the position variable is equal to four, and the position variable plus one is equal to five. The new pseudo-words may include the words "mutehelder," "muteiedler," and "mutegelder." Because the last pseudo-word is the intended word of the user, the user selects this word, ending the method 214.

The user may navigate the pseudo-words presented and select letters or a pseudo-word by using special keys commonly found on the device 100 of FIG. 1. For example, there may be a down arrow key, a left arrow key, a right arrow key, an up arrow key, and a select key, which are not specifically shown in FIG. 1. The user uses the down and up arrow keys to navigate the pseudo-words presented to him or her. When a desired pseudo-word is displayed, the user uses the select key to select the pseudo-word as the intended word. The select key may be one of the unused keys of the numeric keypad, such as the 1, * or #. It may also be a special way of hitting a key, such as holding down the "2" key for a period of time. It may also be the same key used to enter the space character, such that optionally a space may be inserted after it is pressed. Alternatively still, it may be an additional key.

The user uses the right and left arrow keys to select and de-select, respectively, letters of the intended word. A cursor may be used to indicate the letters that the user has already selected. For example, when "|mtvhelder" is displayed, this means that the user has not selected any letters. Pressing the right key once accepts the letter M, such that the new pseudo-words may be presented as "m|tvehelder," "m|utehelder," and "m|vudgelder." The cursor position in this case indicates that the user has accepted the letter M. The user uses the up and down arrow keys to select one of the new pseudo-words, and presses the right key when the desired pseudo-word is indicated to accept the second letter of the indicated pseudo-word. A cursor is not the only way to indicate which letters have been accepted. The system may distinguish between accepted and unaccepted letters in any of a number of ways, including font, size, boldface, italics, underline, color, or background color, or inverse text, or symbols other than a |.

To determine the pseudo-words, a statistical letter language model can be used. Generally, a language model estimates the probability of a sequence of language units, which in this case are letters. For example, if l is a specified sequence of Q letters, $$l = l_1, l_2, \ldots, l_Q \tag{1}$$

then the language model estimates the probability p(l). This can be factored into conditional probabilities by $$p(l) = \prod_{i=1}^{Q} p(l_i|l_1, l_2, \ldots, l_{i-1}) \qquad (2)$$

Next, the approximation that each letter depends only on the previous n letters is made:

$$p(l_i|l_1, l_2, \ldots, l_{i-1}) \approx p(l_i|l_{i-n+1}, l_{i-n+2}, \ldots, l_{i-1}) \qquad (3)$$

Substituting equation (3) into equation (2), $$p(l) \approx \prod_{i=1}^{Q} p(l_i|l_{n-1}, l_{n-2}, \ldots, l_{i-1}) \qquad (4)$$

which is known and referred to as an n-gram letter language model, where n is greater than or equal to 1. Note that Q is equal to the length of the entered numeric key input. For example, if the user has entered the numeric key input 5665, then Q is four. In general, the probabilities are evaluated by occurrence counting in any type of database, such as a database of magazine articles, books, newspapers, or another type of database. For large values of n, it is necessary to prune the language model, using, for instance, count cutoffs, or a relative entropy based technique, such as Stolcke pruning, as known in the language modeling art.

A language model can optionally also take into account letters to the left of the entered sequence. For instance, if $1_{-9}$ $1_{-8}$ $1_{-7}$ $1_{-6}$ $1_{-5}$ $1_{-4}$ $1_{-3}$ $1_{-2}$ $1_{-1}$ $1_{-0}$ are the last then letters entered by the user, and equation (4) is used, the probability will depend on the previous letters. Also optionally, it may be assumed that the next letter following the observed letters is "space". The letter probabilities are then multiplied by p("space" $|1_{Q-n}1_{Q-n}+1\ldots 1_Q$) This makes a sequence like "req" relatively less likely, which is reasonable, considering that "q" almost never ends a word, even though the sequence "req" is reasonably likely in contexts such as "request" or "require."

An n-gram letter language model can therefore be used to determine the pseudo-words presented to the user, or, more generally, to determine the sequences of letters presented to the user. That is, an n-gram letter model can be used to examine the previous n-1 letters to determine the current, nth, letter of the current number sequence. An n-gram letter model is generally constructed by examining a database, or training corpus. Typically, the model needs to be smoothed, as is known in the art of language modeling. The model can be improved over time by retraining the model with more complete databases, or by considering what the user has him or herself specifically entered in the past. The latter is referred to as using a cache model, where the last x letters entered are stored in a cache, with x being large, typically 100-10000.

Finally, it is noted that there is no need for the pseudo-words to be limited to letters. Just as real words can contain numbers and punctuation, so can pseudo-words. For instance, "$1", "1st", "Mr." "under-achiever" "555-1212" and "http://www.research.microsoft.com/~joshuago" are all possible strings the user might wish to enter. Therefore, punctuation and digits may be included as "letters" as used herein. Similarly, a user may or may not wish to distinguish upper and lower case letters. For some applications, there may be a special shift key, which can be used to determine if a lowercase or uppercase letter is desired. Alternatively, lowercase and uppercase letters can be modeled as different letters, and the letter n-gram model can be used to decide between them.

Determining Sequences of Letters such as Pseudo-Words

FIG. 4 is a flowchart of a method 302 showing how one embodiment in particular determines sequences of letters that are consistent with the letters already accepted by the user, and are consistent with the entered numeric key input. The method 302 starts in 400 with a prefix equal to the letters already accepted by the user, and the entered numeric key input. If no letters have been accepted by the user yet, then the prefix is null. In 402, the letters consistent with the number sequence at the position corresponding to the prefix plus one are determined. For example, if the number sequence is 3287, and the prefix is equal to "e," then the letters determined would be the letters mapped to the number 2, or, A, B, and C. This is because the prefix corresponds to the first number of the number sequence, such that the number at the position corresponding to the prefix plus one within the number sequence 3287 is the number 2.

In 404, the method 302 starts with the first consistent letter as the current consistent letter. In the case of the example, this is the letter A. In 406, the most likely pseudo-word that is consistent with the number sequence, and that begins with the prefix followed by the current consistent letter, is determined. In the example, this is the most likely pseudo-word that is consistent with the number sequence 3287 and that begins with the letters "ea." The letter E is from the prefix, whereas the letter A is the current consistent letter. In 408, if there are more consistent letters, then the method proceeds to 410, where the next consistent letter is advanced to as the current consistent letter, and the method 302 repeats 406. Otherwise, the method proceeds to 412, where the most likely pseudo-words are returned. There will be a pseudo-word returned for each letter that is consistent with the number sequence at the position within the number sequence after the prefix.

Figure 5A:
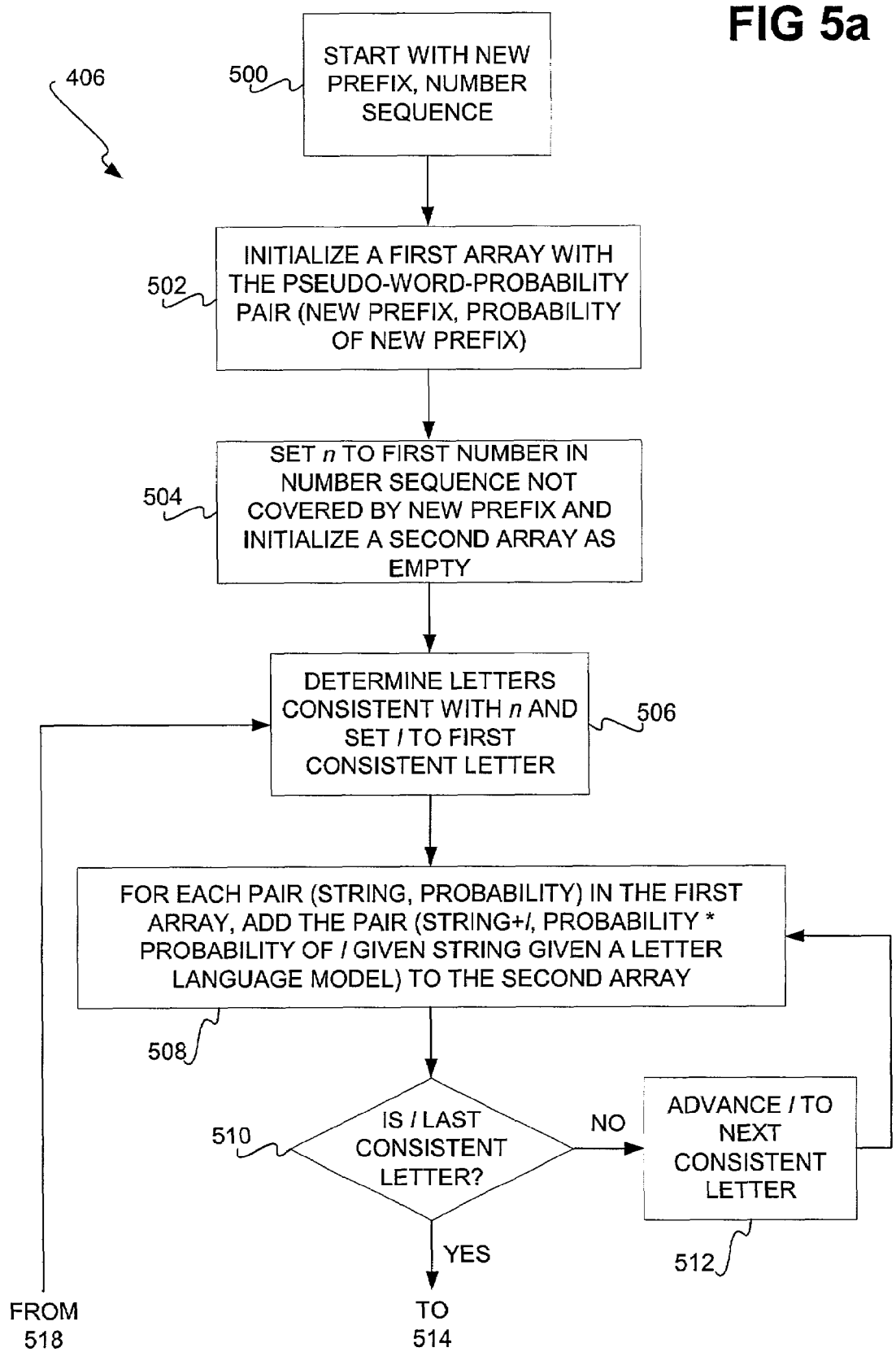

FIGS. 5a and 5b are flowcharts of a method 406 that one embodiment follows to determine the most likely pseudo-word for a new prefix and a number sequence. The method 406 starts in 500 with the new prefix and the number sequence. The new prefix is the prefix of FIG. 4 plus the current consistent letter. In 502, a first array of word-probability pairs is initialized with the pseudo-word-probability pair (new prefix, probability of the new prefix). The probability of the new prefix is the probability that the new prefix is what the user intended to enter for the part of the number sequence that corresponds to the new prefix. The probability is determined based on an n-gram letter modeling approach.

Continuing the previous example, the user may have already accepted the letter e, and the current consistent letter is the letter a, such that the new prefix is "ea." The probability of this prefix is determined using a letter n-gram. In 502, an array with a single entry, the new prefix, "ea", is initialized, as well as its probability, as determined by a letter n-gram model. For simplicity of the example, it is assumed that the letter n-gram model ignores characters in previous words. Then, following equation (4), $$p(\text{``ea''}) \approx \quad (5)$$

$$\prod_{i=1}^{Q} p(l_i | l_{n-1}, l_{n-2}, \ldots, l_{i-1}) = p(\text{``e''}|\text{space}) \times p(\text{``a''}|\text{space``e''})$$

To determine p("e"|space), the number of times a space occurred in the training corpus is found, such as 200,000 times, and the number of times an "e" followed the space, is found, such as 40,000 times. Then p("e"|space) can be estimated as 40,000/200,000=0.2. To determine p("a"|space "e"), the number of times the sequence space "e" occurred in the training corpus is found, such as 40,000 times, and the number of times an "a" followed space "e" is found, such as 5,000 times. This yields an estimate of 5,000/40,000=0.125. Multiplying these together, the probability of the sequence "ea" after a space is estimated to be 0.025. Thus, the array is initialized in 502 to have the single entry "ea", 0.025.

In 504, the number n is set to the first number in the number sequence not covered by the new prefix, and a second pseudo-word-probability pair array is initialized as empty. In the case of the example, the number n is set to the number 8, since within the number sequence 3287, the numbers three and two correspond to the new prefix "ea." In 506, the letters consistent with the number n are determined, and the letter l is set to the first consistent letter. In the case of the example, the letters mapped to the number 8 are T, U, and V. The letter l is set to the first of these letters, the letter T.

In 508, for each pseudo-word-probability pair within the first pair, referred to as each pair (string, probability), the pair (string +1, probability of the string times the probability of 1 given the string) is added to the second array. The phrase string +1 refers to the concatenation of the pseudo-word string and the letter l. The probability of the string is the probability of the pseudo-word in the first array. This is multiplied by the probability of the letter l given the string, which is determined by using a letter language model, as has been described. If the letter l is not the last consistent letter determined in 506, then the method 406 proceeds from 510 to 512, to advance the letter l to the next consistent letter. The method 406 then proceeds to 508. 508 is thus repeated for each letter consistent with the number n. When the last consistent letter has been processed in 508, then the method proceeds from 510 to 514.

In 514, the first array is set to a predetermined number of pairs in the second array that have the highest probability. For example, the twenty pairs in the second array that have the highest probability of any pairs within the second array are set as the first array. In 516, if the number n is not the last number in the number sequence, then the method 406 proceeds to 518, to advance the number n to the next number in the number sequence. The method 406 then proceeds back to 506, to repeat the described process with respect to the new number n. Once the last number in the number sequence has been processed, then the method proceeds from 516 to 520, in which the pair within the first array having the highest probability is returned. This is the most likely pseudo-word consistent with the new prefix and the number sequence started with in 500.

The process followed by the method 406 of FIGS. 5a and 5b is that, starting with the new prefix, the probability of each of the letters consistent with each number in the number sequence after the new prefix is determined, building on the previous probabilities determined. For example, in the case of the new prefix "ea" and the number sequence 3287, first the probability of the new prefix "ea" itself is determined as was described in equation (5). Next, the probability p(l|"ea") for each letter l consistent with the number 8, given the prefix, is determined, which is multiplied by the probability of the new prefix "ea" itself, yielding probabilities for "eat", "eau", and "eav". Finally, the probabilities p(p|eat), p(q|eat), p(r|eat), p(s|eat), p(p|eau), p(q|eau), p(r|eau), p(s|eau), p(p|eav), p(q|eav), p(r|eav), and p(s|eav) are determined and multiplied by the probabilities of "eat", "eau" and "eav" as appropriate. This yields an array with probabilities for eatp, eatq, eatr, eats, eaup, eauq, eaur, eaus, eavs, eavp, eavq, eavr, eavs. The most probable of these sequences is returned.

Contextual Approach for Word Determination

The out-of-vocabulary (OOV) user interface and word determination described in the previous sections of the detailed description is a general approach that can be used with any type of text input using numeric keys. In a specific case, the word-determining logic 108 of the device 102 of FIG. 1 determines the word based on the context in which the word was entered. The OOV user interface and word determination integrated with the word-determining logic 108. Prior to the description of this integration in a subsequent section of the detailed description, the manner by which word determination can be accomplished contextually is presented in this section of the detailed description.

As an example of the type of determination performed by the logic 108, the user may have already entered the words "The situation has run," and is currently entering a word corresponding to the number sequence 2665. The number sequence 2665 corresponds to at least two words, "amok" and "bonk." In the context of the words already entered by the user, the word-determining logic 108 may likely select the word "amok" as the intended word of the user, and not the word "bonk." In the context of the previously entered words to the left of the entered sequence, referred to as the left context of the current number sequence, the word "amok" is more likely to occur than the word "bonk." However, if the user has already entered the words "With the ball I shall," and then enters the number sequence 2665, the word-determining logic 108 may likely select the word "bonk" instead of the word "amok." In this case, in the left context of the number sequence entered, the word "bonk" is more likely to occur than the word "amok." The word-determining logic 108 selects a word not only by considering the current number sequence, but also the context in which the current number sequence has been entered.

In the examples of the previous paragraph, the context was referred to as the left context. More specifically, the left context of a current number sequence refers to all the words and/or number sequences to the left of the current number sequence. The word-determining logic 108 may also consider the right context of the current number sequence. The right context of the current number sequence refers to all the words and/or number sequences to the right of the current number sequence. Word determination based on the right context may come about in one of two situations. First, the user may have already entered a number of words, and is inserting a word within the words already entered. In this situation, the specific number sequence entered by the user has a right context in addition to a left context. Second, the user may enter in a number of number sequences corresponding to words, such that the logic 108 does not resolve the sequences into words until the user has finished entering the sentence. In this situation, each number sequence except for the last sequence has a right context.

Alternatively, the logic 108 may continually reevaluate the determined word based on additional words the user enters. For example, the user may intend to enter the sentence "The ball is what I kicked." Up until the user enters the number sequence corresponding to the word "kicked," the word-determining logic 108 may select the word "call" for the number sequence 2255, instead of the word "ball." However, the logic 108 may continually reevaluate all words based on new words entered. Once the user enters the number sequence corresponding to the word "kicked," the logic 108 may go back and select the word "ball" for the number sequence 2255, instead of the word "call." In general, the logic 108 can use the left context of the current number sequence, the right context of the current sequence, or both the left and the right contexts, which is also referred to as double-sided context.

In addition, the word-determining logic 108 may determine a word based on the number sequence entered by the user as corresponding to an initial part of the word, and not the complete word. As an example, the user may be entering the words "good enough." When the user has pressed the numeric keys corresponding to all except the last letter of the word "enough," which is the number sequence 36684, the word-determining logic 108 may be able to determine that the user is entering the word "enough." This is even though the user has not pressed the four key a final time to enter the letter H. Note that the user could have intended to enter the words "good ennui," but it is significantly more likely that the number sequence 36684 corresponds to all except the last letter of the word "enough," and not the complete word "ennui."

As has been indicated, the word-determining logic 108 uses a machine learning approach to determine the word corresponding to an entered number sequence based on the context of the sequence. In general, machine learning refers to a system capable of the autonomous acquisition and integration of knowledge. This capacity to learn from experience, analytical observation, and other mechanisms, results in a system that may continuously self-improve and thereby offer increased efficiency and effectiveness. More succinctly, a machine learning approach is an approach that improves automatically through experience.

One type of machine learning approach that can be used is a statistical language model. Generally, a language model estimates the probability of a sequence of language units, such as words. For example, if ω is a specified sequence of Q words, $$\omega = \omega_1, \omega_2, \ldots, \omega_Q \qquad (6)$$

then the language model estimates the probability p(ω). This can be approximated by $$p_N(\omega) = \prod_{i=1}^{Q} p(\omega_i | \omega_{i-1}, \omega_{i-2}, \ldots, \omega_{i-N+1}) \qquad (7)$$

which is known and referred to as an n-gram language model, where n is greater than or equal to 1. In general, these probabilities are evaluated by occurrence counting in any type of database, such as a database of magazine articles, books, newspapers, or another type of database. In general, word-based n-gram language models are impractical except for the cases where n is 2 or 3. Where n is 2, the n-gram language model is more specifically referred to as a bigram language model. Similarly, where n is 3, the n-gram language model is more specifically referred to as a trigram language model.

An n-gram language model can therefore be the machine learning approach used by the word-determining logic 108 to determine the intended word corresponding to a number sequence entered by the user with the numeric input keys of the numeric keypad 106. That is, an n-gram model can be used to examine the previous n−1 words to determine the current, nth, word corresponding to the current number sequence. An n-gram model is generally constructed by examining a database, or training corpus. The model can be improved over time by retraining the model with more complete databases, or by considering what the user has him or herself specifically entered in the past. The latter is referred to as using a cache model, where the last x words entered are stored in a cache.

General Spell Checking Approach

The out-of-vocabulary (OOV) user interface and word determination described in previous sections of the detailed description can also be integrated with the spell-checking logic that is optionally part of the word-determining logic 108. The integration of the OOV user interface and word determination with both the word determination approach described in the previous section, and the spell checking approach described in this section, is described in the next section of the detailed description.

The spell-checking logic uses a dictionary, that may or may not be the same as a vocabulary used by the word-determining logic 108 to determine the word corresponding to the numeric key input entered by the user. The dictionary is stored preferably as a tree, or a directed acyclic graphic (DAG) model. The model is then searched, such as recursively, to determine a cost between the entered number sequence and the number sequence for each word in the dictionary. The cost is a similarity measure between the entered number sequence and the number sequence for a word in the dictionary, indicating how similar the sequences are to one another. The cost can be a metric similarity measure that measures a real-valued difference function over the number sequences.

The real-value difference function, d, can be used to measure the cost, and preferably satisfies the following conditions:

1) $d(n, n') \geq 0$

2) $d(n, n') = 0 \Leftrightarrow n = n'$ \qquad (8)

The term d(n, n') indicates the cost between the entered number sequence n, and the number sequence for a word in the dictionary n'. The first condition indicates that the cost between the number sequences n and n' must be non-negative. The second condition indicates that if the cost between the two number sequences is zero, then the sequences are identical.

One real-value difference function that can be used is the known minimum edit metric, or distance. The minimum edit distance is an agglomerative measure of similarity with respect to the entered number sequence $n = n_1 n_2 \ldots n_i$, and the number sequence for a word in the dictionary $n' = n'_1 n'_2 \ldots n'_j$. The entered number sequence n has i digits, whereas the number sequence for a word in the dictionary n' has j digits.

The minimum edit distance gives the minimum number of insertions, deletions, and substitutions necessary to change n into n', or vice versa. The minimum edit distance is defined recursively as follows:

$$d(0, 0) = 0 \quad (9)$$

$$d(i, j) = \min \begin{bmatrix} d(i, j-1) + 1, \\ d(i-1, j) + 1, \\ d(i-1, j-1) + v(n_i, n'_j) \end{bmatrix}$$

where $$v(n_i, n'_j) = 0 \Leftrightarrow n_i = n'_j$$

$$v(n_i, n'_j) = 1 \Leftrightarrow n_i \neq n'_j \quad (10)$$

When using the minimum edit distance as the cost, a measure of similarity between two number sequences is extracted by creating a directed acyclic graph for all nodes (i, j), with horizontal and vertical edges weighted one, which is a penalty for a mismatch, and the weights of the diagonal edges determined by v. Because penalties are cumulative, the more dissimilar number sequences will have the longest, shortest paths. The difference measure, or minimum edit distance, d, satisfies the conditions above. Besides the minimum edit distance, non-metric agglomerative similarity measures can also be used. Such measures may be based on, for example, n-gram analysis.

Because the minimum edit distance itself is recursively defined, searching the directed acyclic graph between two number sequences is preferably recursively performed. A maximum distance is established, such that once exceeded, the recursion search stops for a number sequence for a given word in the dictionary compared to the entered number sequence. Preferably, this maximum distance is two. All the words having number sequences with a minimum edit distance of no greater than two from the entered number sequence are potential correctly spelled words for the misspelled word with the entered number sequence. It is noted that traditional letter-based dictionaries can be used with the invention, where substitution or mismatch penalties occur based on different numbers, instead of different letters. For example, where the entered number sequence includes the number 6, if this number is being compared in the graph against a letter, a mismatch penalty will not occur for the letters M, N, and O. This is because each of these letters maps to the number 6. Alternatively, a dictionary can be stored by number sequences for the words, instead of by letters. This is more efficient computationally, but less efficient for storage and other purposes, since the number sequence to word mappings still need to be stored.

To search the directed acyclic graph to determine the minimum edit distance, known dynamic programming can be used. Dynamic programming arises where the goal is to enumerate all possible configurations of the given data, and test each one to determine if it is a solution. A table is maintained that contains all the previously determined configurations and their results. If there are only a small number of distinct configurations, dynamic programming avoids redetermining the solution to these problems repeatedly. With respect to determining the minimum edit distance, dynamic programming can be used to determine the path(s) within the directed acyclic graph.

Figure 6:
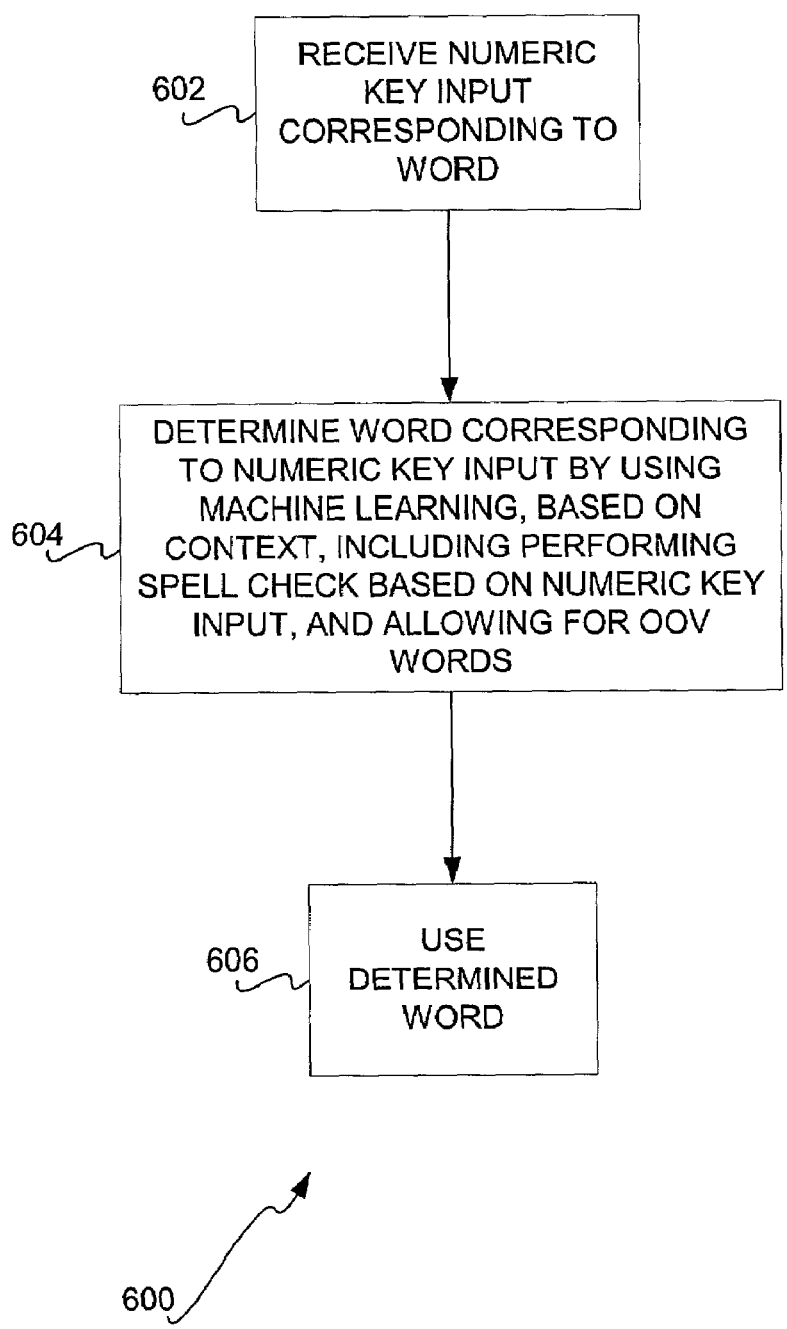
FIG. 6 is a flowchart of a method showing how one embodiment integrates the OOV word determination and user interface with spell checking and contextual word determination.

Integration of Out-Of-Vocabulary (OOV) Word Determination and User Interface with Contextual Word Determination and Spell Checking FIG. 6 is a flowchart of a method 600 showing an overall approach performed by one embodiment to determine the word corresponding to the numeric key input entered by the user based on the context of the input. This approach integrates the contextual word determination and the spell-checking approaches that have been described with the out-of-vocabulary (OOV) word determination and user interface. The method 600 can be performed by the device 102 of FIG. 1. In 602, the device 102 receives numeric key input corresponding to a word, where the input has a left context, a right context, or both. In 604, the device 102, and more specifically the word-determining logic 108 of the device 102, determines the word corresponding to the numeric key input. The logic 108 makes this determination by using a machine learning approach, based on either the left context, the right context, or both, of the numeric key input. The logic 108 also incorporates the spell-checking logic to perform a spell check based on the numeric key input. For example, for a given entered numeric key input, a potential word determined by the spell-checking logic may be more likely as the intended word of the user than the word determined by the word-determining logic 108. In such an instance, the potential word would then be the determined word of 604. In addition, OOV words are determined and allowed for in 604. The actual word used by the device 102 in 606 as the determined word is selected by the user in 604 using the OOV user interface.

Figure 7B:
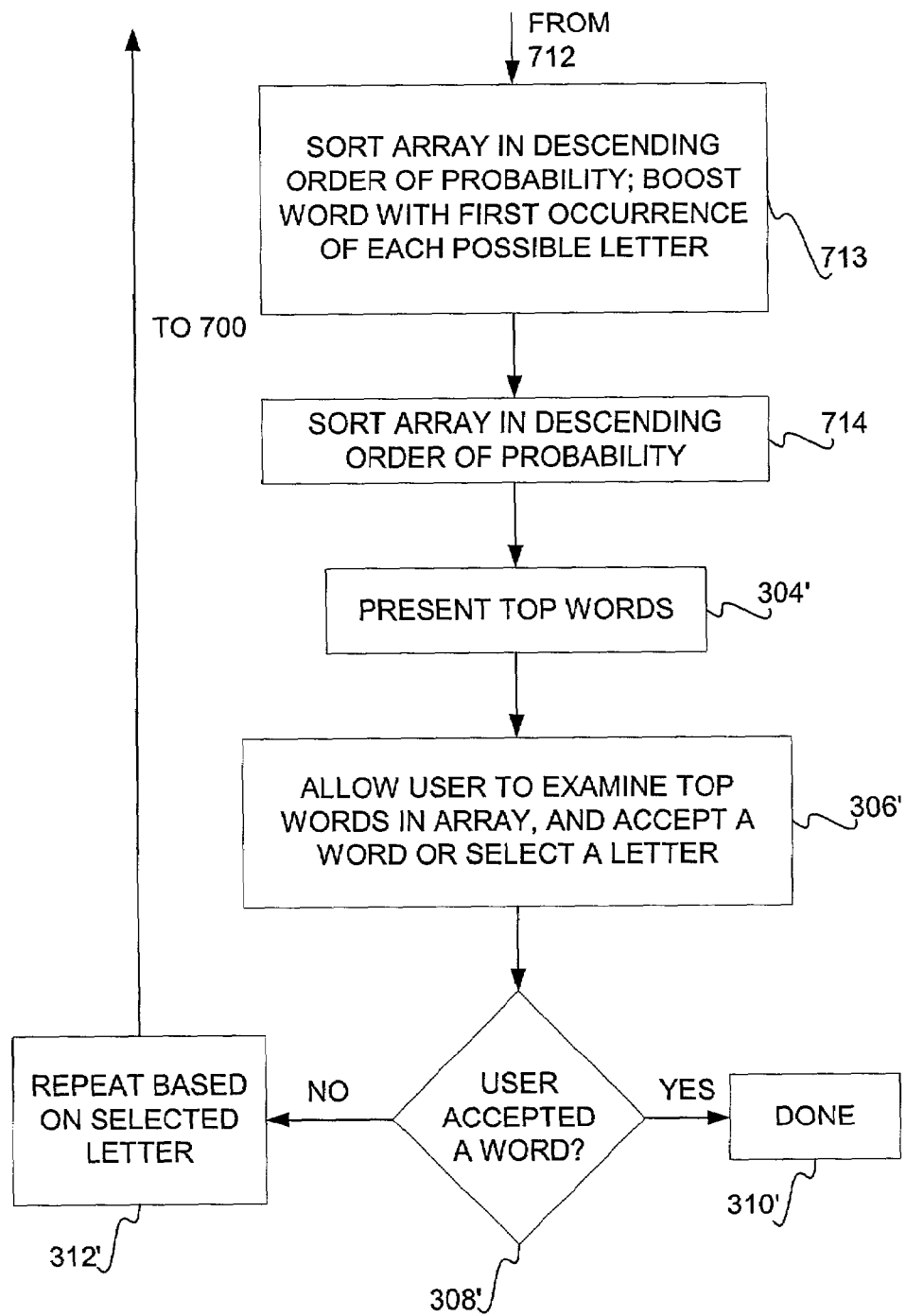

The manner by which the word determination performed by the word-determining logic 108 and the spell checking performed by the spell-checking logic are integrated with the OOV word determination and user interface is described by reference to the method 604 of the flowcharts of FIGS. 7a and 7b. FIGS. 7a and 7b implement an n-gram language model for word determination based on left context, with integrated spell checking and OOV word determination, where the intended word is ultimately selected using the OOV user interface.

In 700, all the words within a predetermined vocabulary that are consistent with the numeric key input are found. This is based on the assumption that the user entered the correct numeric key input for the correct spelling of the intended word. In addition, the words within a cache, where a cache model is being used in addition to the n-gram language model, that are consistent with the numeric key input can be found. The cache stores the last x number of words that the user has entered, in order of entry. In 702, the probability of each word found in 700, given the left context of the numeric key input relative to the words or number sequences already entered, is determined. The probability is determined based on an n-gram modeling approach, such as a bigram or a trigram modeling approach.

For example, the user may have already entered the word "run," and the word "amok" is consistent with the number sequence next entered by the user. Within a training corpus of a million words, the word "run" may appear a thousand times, and the phrase "run amok" may appear once. Thus, the probability of seeing "amok" given that the preceding word is "run" is $\frac{1}{1000} = 0.001$. In practice, because of smoothing issues, the estimated probability is likely to be slightly different. Note that without using an n-gram model, the frequency of use of the word "amok" by itself would have been p(amok) by itself, or $$\frac{1}{1,000,000}.$$

In 704, each word found in 700, and that had its probability determined in 702, is added to an array of word-probability pairs. For example, the word-probability pair for the word "amok," based on the previous paragraph, is (amok, 0.001).

The method 604 of FIGS. 7a and 7b proceeds from 704 to 706, where spell checking is performed by finding all potential words in a dictionary. The spell checking assumes that the entered numeric key input is to some degree the incorrect number sequence for the correct spelling of the intended word, or the correct number sequence for the incorrect spelling of the intended word. The dictionary may be the same set of words used as the vocabulary in 700, or a different set of words. Each word in the dictionary is examined. Those words having number sequences that have a cost as compared to the entered numeric key input less than or equal to the maximum cost are saved as potential words. The cost can be the minimum edit distance, where the allowed maximum cost, or distance, is preferably two.

Figure 8:
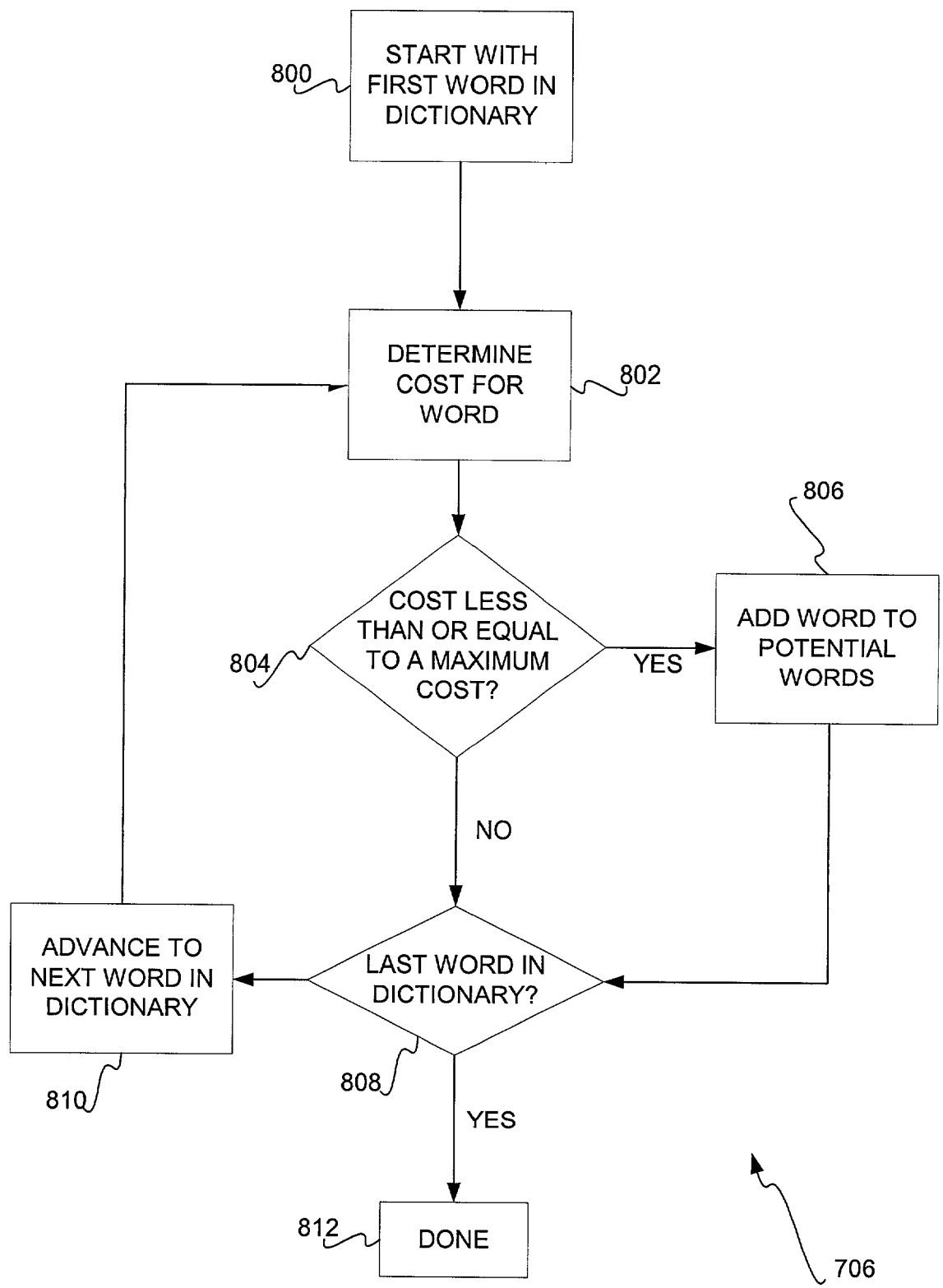
FIGS. 8 and 9 are flowcharts of methods showing how one embodiment implements the spell checking of FIGS. 7a and 7b in more detail.

The manner by which 704 is performed in one embodiment is shown in more detail in the flowchart of FIG. 8. The method 706 of FIG. 8 starts with the first word in the dictionary in 800. The cost for the number sequence for this word, relative to the entered numeric key input, is determined in 802. If the cost for the number sequence for this word is less than or equal to the maximum cost, then the method proceeds from 804 to 806, where the word is added as a potential intended word. Otherwise, the method proceeds from 804 to 808, to which the method also proceeds from after adding the word as a potential word in 806. In 808, if the word is the last word in the dictionary, then the method proceeds to 812, where it is finished. Otherwise, the next word in the dictionary is advanced to in 810, and the method proceeds relative to this new word in 802.

The cost determination of 802 of the number sequences for all of the words relative to the entered numeric key input can be performed by a dynamic programming approach navigating a constructed directed acyclic graph in a recursive manner. An overview of such a cost determination in 802 relative to a number sequence for a single word in the dictionary as compared to the entered numeric key input is shown in the method 802 of the flowchart of FIG. 9. In 900, the cost is initially set to zero. The method is then recursively followed for each number of the number sequence of the word, relative to the corresponding number of the entered numeric key input.

For instance, in 902, the cost is first determined for the first number of the number sequence relative to the first number of the entered numeric key input. If the numbers are the same, the cost is zero, while if they differ, the cost may be one or greater, depending on the weight associated with the appropriate edge in the directed acyclic graph. In 904, once the cost exceeds the maximum cost allowed, then the recursion aborts for this word in 906, where it is concluded that the word corresponding to the number sequence under examination is not a potential word for the intended word of the user.

If the cost does not yet exceed the maximum cost, then in 908 it is determined whether the cost has been completely determined. That is, the method in 908 determines whether all of the numbers of the number sequence for the word have been compared with their corresponding numbers of the entered numeric key input. If not, then the cost is potentially increased by comparing the next number of the number sequence with the next number of the entered numeric key sequence, by proceeding back to 902. If the method has determined that the cost of the number sequence as compared to the entered numeric key sequence is less than or equal to the maximum cost allowed, and the cost has been completely determined, then the method ultimately finishes by proceeding from 908 to 910. In 910, the word having the number sequence that has been compared to the entered numeric key input is deemed a potential intended word by the user.

Figure 9:
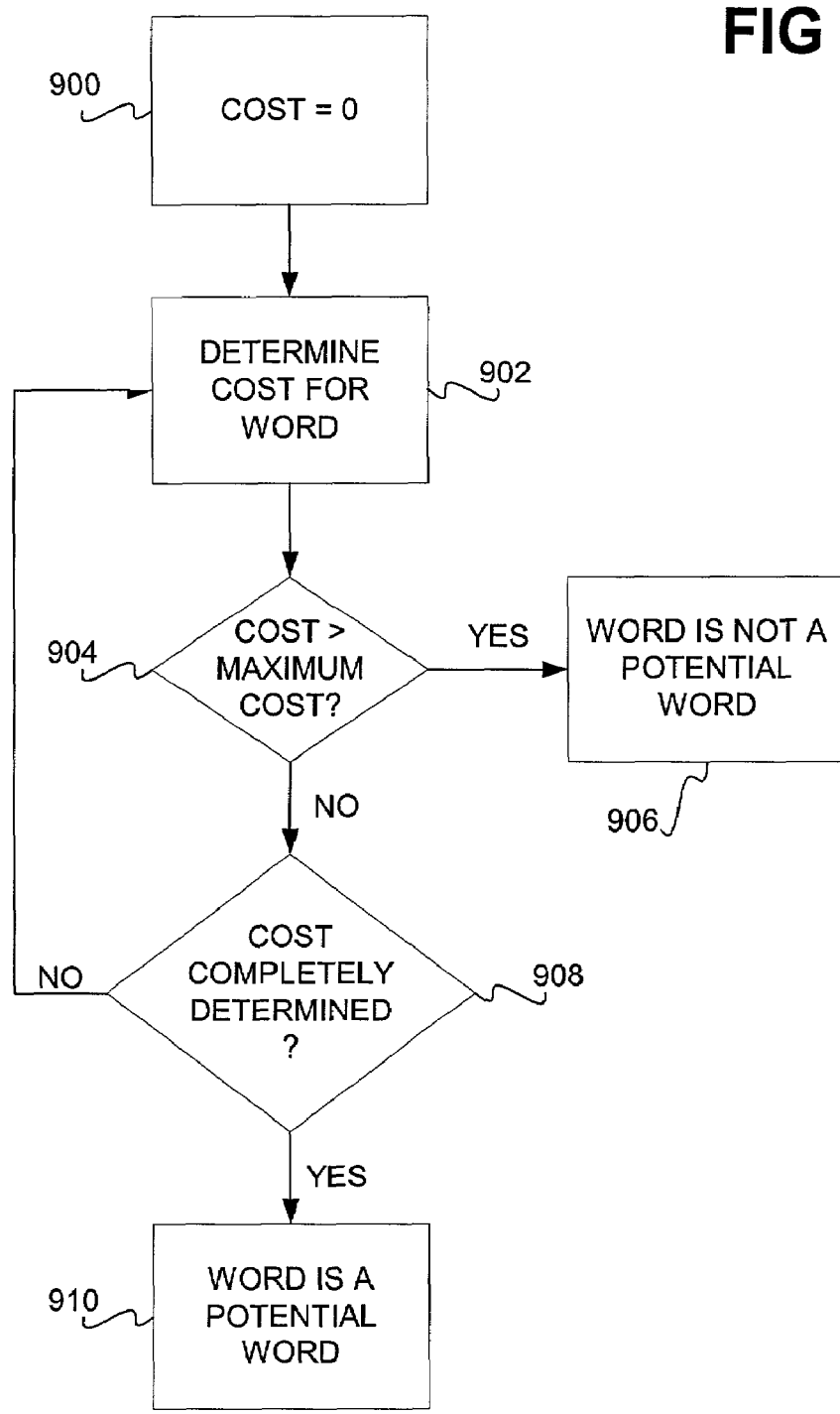

It is noted that the methods of FIGS. 8 and 9 that have been described are presented primarily for explanatory purposes, to describe how the invention works in a clear manner. In practice, the methods of FIGS. 8 and 9 are likely to be too computationally expensive to be practical, such that alternative approaches known in the art would instead be used. For example, a dictionary may be stored as a tree, such that the minimum edit distance between an entered numeric key input and a given word in the dictionary is found by searching a directed acyclic graph (DAG). Such an alternative approach is described in a later section of the detailed description.

Referring back to FIGS. 7a and 7b, in 708, the probability of each potential word, given the context of the potential word, is determined. This determination is similar to the determination performed in 702, except that it takes into account a probability that each letter of the intended word is misspelled. This probability can be 0.0005, for example. To determine the probability p(potential word, entered numeric key input|history), independence is assumed between the spelling mistakes and the history, such that the probability is determined as p(potential word|history)·p(entered numeric key input|potential word). For the probability p(entered numeric key input|potential word), an approximation of 0.0005 to the power of the minimum edit distance between the entered numeric key input and the number sequence corresponding to the potential word is used. It is noted that more accurately, this should be then multiplied by (1-0.0005) to the power of the number of numbers within the number sequence corresponding to the potential word, but this term is close enough to 1 to be neglected. The potential word and its determined probability are then added to the array.

The probability determination of 708 can also take into account a small word penalty. Users are less likely to misspell shorter words, and there tend to be very many possible misspellings for short words, especially if allowing for insertions and deletions. Therefore, whenever the numeric key input includes a small number of digits, such as four or less, the penalty for a misspelling is doubled, such that the penalty in the probability space is squared. As an example, the probability of 0.0005 noted in the previous paragraph would increase to $0.0005^2$, or, 0.00000025.

The probability determination of 708 may also take into account an insertion penalty for the last letter, as double that of the penalty for the other letters. Similar to the small word penalty, the probability of 0.0005 would then be squared to 0.00000025. Without this extra penalty, the user may encounter a disconcerting situation. For example, the user may intend to enter the word "barely" using the numeric keys. After entering the number sequence for the prefix "bare," the word "bare" may be displayed to the user. However, once the user enters the next number corresponding to the letter L, an exact match to the word "barel" may not be found. Therefore, the logic may instead determine that the user had entered the word "bare" and then incorrectly entered the letter L. The word "bare" is still displayed to the user, who may assume that, for example, he or she did not press the number key for the letter L hard enough. Doubling the penalty for the last letter discourages the logic from making the same choice twice, but does not prevent it from doing so. As an example, if the user enters in the word "enoughp" using the numeric keys, the logic still discerns the word "enough." This is because, even with the doubled penalty, an insertion error is still the most likely choice.

In 710, truncated, or partial, words and their associated probabilities are added to the array. For example, where the user has entered the number sequence 435, 710 determines the probability that the user has entered the first letters of the word "hello," as opposed to just the word "gel." FIG. 10 is a flowchart of a method 710 showing how one embodiment determines the truncated, or partial, words and their associated probabilities. In 1000, the words in the vocabulary, and optionally in the cache as well, that have an initial part, or prefix, that are consistent with the numeric key input are found. The entered numeric key input is assumed in 1000 to be the correct number sequence for the correct spelling of the prefix of the intended word. For example, if the user has so far entered the number sequence 36684, the word "enough" may be found, since the first five letters of the word "enough" match the number sequence 36684.

In 1002, the probability of each word found in 1000 given the left context of the numeric key input relative to the words or number sequences already entered is determined. The probability is determined based on an n-gram modeling approach, such as a bigram or a trigram modeling approach. If the probability for a given word found in 1000 is the greatest probability for any word found in 1000 so far, then this word-probability pair is remembered, or stored, as the greatest probability word and the greatest probability, respectively.

The method 710 proceeds to 706' from 1002, where spell checking is performed by finding all potential words in a dictionary that represent a correct spelling of the prefix of the intended word. The spell checking assumes that the entered numeric key input is to some degree the incorrect number sequence for the correct spelling of the prefix of the intended word, or the correct number sequence for the incorrect spelling of the prefix of the intended word. The process performed in 706' is similar to what has been described in conjunction with 706 in FIGS. 7a and 7b, except that prefixes of words are considered, instead of complete words. In this manner, words of which prefixes have number sequences having a cost as compared to the entered numeric key input less than or equal to the maximum cost are saved as potential words. The cost can be the minimum edit distance, where the allowed maximum distance is preferably two.

In 1004, the probability of each potential word found in 706', given the context of the potential word, is determined. This determination is the same as the determination performed in 708 of FIGS. 7a and 7b. In particular, the probability p(potential word, entered numeric key input is a [possibly misspelled] prefix of the potential word|history) is determined. Assuming independence between spelling errors and histories, this is equivalent to the probability of the potential word given the history, p(word|history), multiplied by the probability of the entered numeric key input, given that the numeric key input is a prefix of the potential word. There are many possible prefixes for a given word. Therefore, a given probability to the power of the minimum edit distance between the entered numeric key input and any prefix of the potential word is used as an approximation to the probability of the numeric key input being a prefix of the word. The given probability is the probability that each letter has been misspelled, and, as has been noted in the description of 708 of FIGS. 7a and 7b, can be 0.0005. If the probability for a given potential word found in 706' is the greatest probability for any word found in either 706' or 1000 so far, then this word-probability pair is remembered as the greatest probability word and the greatest probability, respectively.

In 1006, if the greatest probability word is significantly more likely than the word of the first word-probability pair in the array, then the greatest probability word-greatest probability pair is inserted at the beginning of the array. One measure that can be used to determine if the greatest probability word is significantly more likely than the word with the greatest probability within the array is whether the greatest probability word has a probability that is more than a predetermined number of times greater than the word with the greatest probability within the array. For example, the greatest probability word may be significantly more likely if this word has a probability more than one-hundred times that of the word with the greatest probability within the array. In this example, if the greatest probability word is significantly more likely, then the word-probability pair inserted at the beginning of the array is the pair greatest probability word-greatest probability times one hundred. This constant by which the probability of the greatest probability word is multiplied for comparison with the word with the greatest probability within the array is referred to as the truncation, or partial word, penalty.

Referring back to FIGS. 7a and 7b, the method proceeds from 710 to 302'. In 302', pseudo-words, or more generally sequences of letters, consistent with the entered numeric key input are determined. The pseudo-words are determined similar to as has been described in the method 302 of FIG. 4. The method 302 of FIG. 4 returns in 412 only the most likely pseudo-words, where each letter corresponding to the number in the numeric key input immediately after that part of the input corresponding to the user-accepted letters is represented in a pseudo-letter. The method 302 of FIG. 4 determines the likely pseudo-words in part by following the method 406 of FIGS. 5a and 5b. In 520 of the method 406 of FIGS. 5a and 5b, the pseudo-word in the first array having the highest probability is returned to the method 302 of FIG. 4. The method 302 of FIG. 4 calls the method 406 of FIGS. 5a and 5b one time for each letter corresponding to the number in the numeric key input immediately after that part of the input corresponding to the user-accepted letters.

The difference in 302' as compared to the method 302 is that in the latter, only the pseudo-word in the first array having the highest probability is returned to the method 302 from 520 of the method 406 of FIGS. 5a and 5b. By comparison, in 302', a predetermined number of pseudo-words in the first array that have the highest probabilities are returned to 302' from 520 of the method 406 of FIGS. 5a and 5b. For example, the top five pseudo-words may be returned. As a result, if only three pseudo-words are determined in the method 302 of FIG. 4, as corresponding to the most likely pseudo-word for each of the three letters mapped to a particular number of the entered numeric key input, then fifteen pseudo-words are determined in 302'. That is, the five most likely pseudo-words for each of three letters mapped to the particular number of the entered numeric key input are determined in 302'.

Still referring to FIGS. 7a and 7b, in 712, the probabilities for the pseudo-words determined in 302' are adjusted. The base probabilities, before adjustment, are the probabilities determined for the pseudo-words in the method 406 of FIGS. 5*a* and 5*b*. For all the pseudo-words, their probabilities are multiplied by an out-of-vocabulary penalty, such as 0.003. The pseudo-words and their probabilities are then added to the array.

Next, in 713 of FIG. 7*b*, a first occurrence bonus is introduced. First, the array is sorted in descending order of probability. Then, for the first occurrence of each possible letter following the prefix to occur early in the array, the probabilities of the words or pseudo-word for each such letter are multiplied by a first occurrence bonus, such as 30. This probability is in addition to any other bonuses or penalties, including the out-of-vocabulary penalty of 0.003. The words or pseudo-words that have their probabilities receive the first occurrence bonus are those—having the highest probability for each letter mapped to the particular number of the entered numeric key input, as determined in 302'.

The method 604 of FIGS. 7*a* and 7*b* proceeds to 714 from 713. In 714, the array to which word-probability pairs have been added is sorted in descending order of probability. This is one way by which the word-probability pair within the array that has the greatest probability can be determined. From 714, the method 604 proceeds to 304', in which the top predetermined number of words, in terms of probability, are presented to the user. For example, the twenty words with the highest probabilities may be presented to the user. 304' is similar to 304 of FIG. 3, except that in the latter, only pseudo-words are presented to the user, whereas in the former, words including pseudo-words are presented.

In 306', the user is given two options when examining the words. First, he or she can select one of the words as the intended word. If this is the case, the method proceeds from 308' to 310', where it is finished. In this case, 306', 308', and 310' are similar to 306, 308, and 310 of FIG. 3, except that in the latter, only pseudo-words are examined by the user, whereas in the former, words including pseudo-words are examined. Second, the user can select the next letter of the intended word. In the case of the first iteration through the method 604 of FIGS. 7*a* and 7*b*, the next letter is the first letter. Where the user has selected the next letter of the intended word, the method 604 proceeds from 308' to 312'. 312' is similar to 312 of FIG. 3, except that in the latter, an explicit position variable is incremented to indicate that the user has accepted the next letter of the intended word. The method 604 proceeds from 312' back to 700 to perform the process again. However, in these subsequent iterations, the knowledge that the user has indicated one or more letters of the intended word is used when determining words and partial words. For example, the words in 700 and 706, the partial words in 710, and the pseudo-words in 302', are determined taking into account the accepted one or more letters by the user.

Pseudo-Code

The methods that have been described with respect to the out-of-vocabulary (OOV) word determination and user interface can be represented as a series of pseudo-code subroutines. The first subroutine returns pseudo-words.

```
Function GetPseudoWord (String prefix, String numbers) returns <String,
Probability>
    Array<String, Probability> stringList /* an array of
string/probability pairs - active hypotheses */
        stringList = {<prefix, p(prefix)>} /* initialize stringlist to
array with one hypothesis: prefix, probability of prefix */
        for each number n in numbers not already covered by prefix
            Array<String, Probability> newStringList
            for each letter l consistent with n
                for each <string, probability> pair in stringList
                    /* let p(l | string) be the probability of a
                    letter given a string, using a letter n-gram model,
                    built from those letter sequences that do not
                    correspond to words in the dictionary. */
                        add <string + l, probability * p(l | string) to
newStringList
                next <string, probability>
            next l
            set stringList to top 20 elements of newStringList
        next n
        return best element in stringList
end Function
```

The next subroutine returns a sorted array of matches. The purpose of this subroutine is to add an out-of-vocabulary word starting with the prefix and each possible letter of the next number and consistent with the number sequence. These out-of-vocabulary words are penalized by an out-of-vocabulary probability, such as 0.003. However, the first occurrence of each possible letter following the prefix should be early in the list, so the first occurrence is boosted by a first occurrence bonus, such as 30.

```
/* prefix is a prefix of known letters; numbers is the remaining
numbers after the prefix */
Function GetMatches (prefix, numbers) returns Array<String,
Probability>
    Array<String, Probability> scoreStrings; /* an array of pairs of
probabilities and strings - scores roughly correspond to probabilities
*/
    let scoreStrings be, sorted, the 20 best words, including
misspellings, as specified above, and <truncScore, truncString> be the
score of the best truncation (including misspellings)
        if truncScore > 100 * scoreStrings [0] .score then
            add <truncScore, truncstring> to front of scoreStrings
array
        end if
        let n be the next number in numbers not already covered by prefix
        for each letter l consistent with n
            if no word in scoreStrings begins with prefix + l then
                <string, probability> = GetPseudoWord(prefix + l,
                numbers)
                add <string, probability * .003> to scorestrings
            end if
        next l
        sort scoreStrings by probability
        for each letter l consistent with n
            find first <string, probability> in scoreStrings such that
string starts with prefix + l
                boost probability by a factor of 30
        next l
        sort scoreStrings by probability
        return scoreStrings
End Function
```

The final subroutine is the main loop for inputting one word. The purpose of this loop is to obtain each new letter, as well as to allow editing of the current word. The user can accept one letter at a time. After each new letter is accepted, a new list is determined consistent with all accepted letters, and with at least one choice for each possible next letter.

```
Subroutine GetOneWord
    String numbers = "";
    String prefix = "";
    int choice = 0;
    for each key k until the user hits "accept" key do
        if k is a number
            numbers = numbers + n
            compute best words, including misspellings, and best
truncation;
            redisplay
        else if k is a left arrow
            delete one letter of the prefix
            compute best words, including misspellings, and best
truncation;
            redisplay
        else if k is a right arrow
            append next letter of current choice to prefix;
advance cursor
            compute best words, including misspellings,
            and best truncation as specified above; redisplay
        else if k is an up or down arrow
            scroll through list of best words
        else if k is space bar
            insert text of current selected word + space bar into
text
        end if
    next k
End Subroutine
```

Directed Acyclic Graph and Pseudo-Code for Searching

When using the minimum edit distance as the cost, a measure of similarity between two number sequences is extracted by creating a directed acyclic graph (DAG) for all nodes (i, j), with horizontal and vertical edges weighted one, which is a penalty for a mismatch, and the weights of the diagonal edges determined by v. Because penalties are cumulative, the more dissimilar number sequences will have the longest, shortest paths. Besides the minimum edit distance, non-metric agglomerative similarity measures can also be used. Such measures may be based on, for example, n-gram analysis.

Because the minimum edit distance itself is recursively defined, searching the directed acyclic graph between two number sequences is preferably recursively performed. A maximum distance is established, such that once exceeded, the recursion search stops for a number sequence for a given word in the dictionary compared to the entered number sequence. Preferably, this maximum distance is two. All the words having number sequences with a minimum edit distance of no greater than two from the entered number sequence are potential correctly spelled words for the misspelled word with the entered number sequence. It is noted that traditional letter-based dictionaries can be used with the invention, where substitution or mismatch penalties occur based on different numbers, instead of different letters. For example, where the entered number sequence includes the number 6, if this number is being compared in the graph against a letter, a mismatch penalty will not occur for the letters M, N, and O. This is because each of these letters maps to the number 6. Alternatively, a dictionary can be stored by number sequences for the words, instead of by letters. This is more speed efficient, but less efficient for storage and other purposes, since the number sequence to word mappings still need to be stored.

To search the directed acyclic graph to determine the minimum edit distance, known dynamic programming can be used. Dynamic programming arises where the goal is to enumerate all possible configurations of the given data, and test each one to determine if it is a solution. A table is maintained that contains previously determined configurations and their results. If there are only a small number of distinct configurations, dynamic programming avoids redetermining the solution to these problems repeatedly. With respect to determining the minimum edit distance, dynamic programming can be used to determine the path(s) within the directed acyclic graph.

Pseudo-code for determining the minimum edit distance between a number sequence and a dictionary encoded as letters is now first described and then provided. The dictionary is stored as a tree, such that there is a distinguished root node of the tree, ROOT. Each node of the tree (except the ROOT) contains a letter, indicating that that letter is appended to any path from the root node through that point. A function, LETTER(NODE), indicates this letter. Each node of the tree may contain a "word end marker" indicating that a path from the root node to the current node spells a valid word of the dictionary. There is a Boolean predicate END(NODE) that is true if the node is an end node.

Each node of the tree also contains a possibly empty list of pointers to following (child) nodes. The pointers can be stored in any of many known forms, including pointers to memory, indices into a table, or by laying out the structure in memory such that the number of children is indicated and children follow parents in a known order. There is a function CHILDREN(NODE) that returns an array of pointers to the children. It is further assumed that there is a way to determine the parent node PARENT(NODE) of each node. There need not be an actual pointer to the parent, however. To reach a node from the root, one must travel through the node's parent, so it is usually possible to remember the parent when examining a child.

A function n(LETTER) is defined that returns the number corresponding to a letter. The following function can then be defined:

$$d(ROOT, j) = j \quad (11)$$

$$d(NODE, j) = \min \begin{bmatrix} d(NODE, j-1) + 1, \\ d(parent(NODE), j) + 1, \\ d(parent(NODE), j-1) + \\ v(n(LETTER(NODE)), n_j) \end{bmatrix}$$

where v is defined the same as before. A depth-first traversal of the tree can be performed, determining the function d(NODE, j). A particular portion of the tree cannot be searched whenever for some NODE, for all j, d(NODE, j) is greater than some maximum, preferentially 2. LENGTH is set as the length of the entered numeric sequence. Whenever a node of the tree for which END(NODE) is true and d(NODE, length) is less than the aforesaid maximum is observed, the path from the root to this point is recorded as a possible word. Whenever a node of the tree for which d(NODE, length) is observed, the path from the root to this point is recorded as a possible prefix.

The pseudo-code that has been described is provided as a recursive procedure as follow:

```
// Pseudocode for doing spelling correction on a tree:
// note that maxScore can be changed
const maxScore = 2;
```

-continued

```
Procedure Distance (NODE *parent
                    NODE *self
                    String sequence,
                    Array [0. . inputLength] parentScores)
{
    // Note that parentScores [j] = d(parent, j)
    Array<int> myScores;
    // deletion penalty on first letter
    myScores [0] = parentScores [0] + 1;
    // Possible optimization: examine only
    // those elements of myScores such that
    // an appropriate parentScores element is less than maxScore
    for j = 1 to inputLength {
        // Variations include weighting insertion, deletion,
        // substitution differently, or making them dependent
        // on the actual letters affected.
        // Variation: insertionScore might be doubled for last letter
        insertionscore = myScores [j−1] + 1;
        // Variation: deletionScore might be doubled for last letter
        deletionScore = parentScores [j] + 1;
        // Variation: store the dictionary as a tree or DAG
        of numbers
        // instead of letters, keeping additional information either
        // separately, or in the tree nodes, to convert each numeric
        // dictionary entry into a list of one or more words. Main
        // change (besides code to extract words) is to definition of
        // substitutionScore
        substitutionScore = parentScores [j−1] +
                            v(n(LETTER(self), number [j]));
        myScores [i] = min(insertionscore,
                           deletionScore,
                           substitutionScore);
    }
    // Variation: maxScore might be smaller for short words, etc.
    if (myScores [inputLength] <= maxScore and END(self)) {
        add sequence (or WORDID(self)) as a possible word with
        probability pow( .0005, myScores [inputLength]);
        // Other code will modify probability by n-gram
        // or other factors.
        // Penalty might be different for short words.
        // Variation: keep only the top 20 or so words, computing
        // penalties etc. at this time.
    }
    // Variation: maxScore might be smaller for short words, etc.
    if (myScores [inputLength] <= maxScore) {
        add sequence (or WORDID(self)) as a possible truncation
        with probability pow( .0005, myScores [inputLength]).
        // Other code will modify probability by n-gram
        // or other factors
        // as well as truncation penalty.
        // Penalty might be different for short words
        // Variation: store only the single best truncation
    }
    if (some element of myScores <= maxScore) {
        for each child of self {
            call Distance(self, child,
                          sequence + Letter(self), myScores);
        }
    }
}
// To evaluate from root, do:
for each child of ROOT {
    call Distance(ROOT, child, "", {0, 1, 2, . . ., inputLength});
}
```

This pseudo-code can also essentially be used to search a DAG representation of a dictionary. The pseudo-code may also be modified to search a DAG- or tree-based dictionary where the nodes represent number sequences instead of letter sequences. This advantageously allows for more efficient searches of the tree, because words with the same number sequence can be searched together. However, doing so requires storing additional information to map each terminal number sequence to a list of one or more letter sequences that correspond to it. The storage for this correspondence may be kept either incrementally in the nodes of the tree, or stored in the leaves or terminal nodes only.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, the methods that have been described can be stored as computer programs on machine- or computer-readable media, and executed therefrom by a processor. Therefore, it is manifestly intended that this invention be limited only by the claims and equivalents thereof.

I claim:

1. A method for selecting an intended word entered using a reduced keypad, where each of one or more keys of the reduced keypad is mapped to a plurality of letters, the method comprising:

for an entered key input indicative of pressing one or more keys in the reduced keypad using a single-tap approach in which one of the keys mapped to a plurality of letters is pressed only once for each letter such that each key press is mapped to only one letter, determining one or more sequences of letters as the intended word based on a score for each of the one or more sequences of letters; and presenting the one or more sequences of letters as the intended word, where a user selects the intended word from the one or more sequences of letters, without resorting to a multiple-tap approach in which one of the keys mapped to a plurality of letters is pressed at least once for each letter, such that a number of times one of the keys is pressed indicates only one letter, and where the user can indicate, without resorting to the multiple-tap approach, an accepted one or more initial letters of the intended word from the one or more sequences of letters, the one or more initial letters having less letters than the intended word, to cause redetermination of the one or more sequences of letters presented as the intended word as a function of the accepted one or more initial letters.

2. The method of claim 1, wherein the reduced keypad is a numeric keypad.

3. The method of claim 1, wherein the sequences of letters each corresponds to a word not listed in a predetermined dictionary.

4. The method of claim 1, wherein the sequences of letters each corresponds to a pseudo-word.

5. The method of claim 1, further comprising receiving selection of the intended word from the user from the one or more sequences of letters.

6. The method of claim 1, further comprising:

receiving indication of a first letter of the intended word from the user; and repeating the method such that the one or more sequences of letters are redetermined taking into account the first letter of the intended word indicated by the user.

7. The method of claim 6, further comprising:

receiving indication of a second letter of the intended word from the user; and repeating the method such that the one or more sequences of letters are redetermined taking into account the first and the second letters of the intended word indicated by the user.

8. The method of claim 1, wherein the user has accepted a number of letters of the intended word, the number equal to zero or more, and determining the one or more sequences of letters comprises determining the one or more sequences of letters consistent with the entered key input and the number of letters accepted by the user.

9. The method of claim 8, wherein the one or more sequences of letters comprises a sequence of letters for each letter corresponding to a number within the entered key input immediately after a part of the entered key input corresponding to the number of letters accepted by the user.

10. The method of claim 9, wherein the sequences of letter for each letter corresponding to the number within the entered key input immediately after the part of the entered key input corresponding to the number of letters accepted by the user comprises a most likely sequence of letters for each letter corresponding to the number within the entered key input immediately after the part of the entered key input corresponding to the number of letters accepted by the user.

11. The method of claim 10, wherein the most likely sequence of letters for each letter corresponding to the number within the entered key input immediately after the part of the entered key input corresponding to the number of letters accepted by the user is determined by using a letter language model.

12. The method of claim 11, wherein using the letter language model comprises using an n-gram letter model.

13. The method of claim 1, wherein determining the one or more sequences of letters comprises using a letter language model.

14. The method of claim 13, wherein using the letter language model comprises using an n-gram model.

15. The method of claim 1, further comprising receiving the entered key input.

16. The method of claim 1, further comprising:
 determining a word corresponding to the entered key input as the intended word;
 determining whether the word determined is in a dictionary of words; and
 ending the method in response to determining that the word determined is in the dictionary of words.

17. The method of claim 1, wherein the method is performed by execution of a computer program by a processor from a computer-readable medium.

18. A computer-readable medium having instructions stored thereon for execution by a processor to perform a method for selecting an intended word entered using a reduced keypad, where each of one or more keys of the reduced keypad is mapped to a plurality of letters, the method comprising:
 repeating, for an entered key input, a user having accepted a number of letters of the intended word, the number equal to zero or more and less than a number of letters of the intended word, determining one or more sequences of letters as the intended word consistent with the entered key input and the number of letters accepted by the user;
 presenting the one or more sequences of letters as the intended word to the user; and
 receiving indication that an additional one of the letters of the intended word has been accepted by the user, such that the number of letters of the intended word accepted is increased by one, until indication has been received that the user has selected one of the one or more sequences of letters presented as the intended word.

19. The medium of claim 18, wherein the reduced keypad is a numeric keypad.

20. The medium of claim 18, where the sequences of letters each corresponds to one of a word not listed in a predetermined dictionary and a pseudo-word.

21. The medium of claim 18, wherein the one or more sequences of letters comprises at least one sequence of letters for each letter corresponding to a number within the entered key input immediately after a part of the entered key input corresponding to the number of letters accepted by the user.

22. The medium of claim 21, wherein the at least one sequence of letters for each letter corresponding to the number within the entered key input immediately after the part of the entered key input corresponding to the number of letters accepted by the user comprises a most likely sequence of letters for each letter corresponding to the number within the entered key input immediately after the part of the entered key input corresponding to the number of letters accepted by the user.

23. The medium of claim 18, wherein the one or more sequences of letters is determined by using a letter language model.

24. The medium of claim 23, wherein using the letter language model comprises using an n-gram letter model.

25. The medium of claim 18, the method further comprising receiving the entered key input.

26. The medium of claim 18, the method further comprising:
 determining a word corresponding to the entered key input as the intended word;
 determining whether the word determined is in a dictionary of words; and,
 ending the method in response to determining that the word determined is in the dictionary of words.

27. A method for selecting a word entered using a reduced keypad, where each of one or more keys of the reduced keypad is mapped to a plurality of letters, the method comprising:
 receiving key input corresponding to the word, the key input having a left context;
 for each word in a vocabulary that is consistent with the key input, determining a probability of the word given the left context, and adding the word and the probability of the word to an array of word-probability pairs;
 finding one or more potential words from a dictionary of words, where each potential word has a cost between the entered key input and a sequence corresponding to the potential word less than a maximum cost;
 determining a probability of each potential word given the left context and taking into account a probability that each letter of the potential word is misspelled, and adding the potential word and the probability of the word to the array;
 determining one or more sequences of letters consistent with the entered key input and a number of letters accepted by a user, the number equal to zero or more, the one or more sequences of letters including at least one sequence of letters for each letter corresponding to a number within the entered key input immediately after a part of the entered key input corresponding to the number of letters accepted by the user;

determining a probability of each sequence of letters taking into account an out-of-vocabulary penalty and a first occurrence bonus, and adding the sequence of letters and the probability of the sequence of letters to the array;

sorting the array of word-probability pairs in decreasing order of probability; and presenting a first number of words from the array of word-probability pairs to the user, where the user selects the word corresponding to the entered key input from the first number of words presented and where the user can indicate additional letters have been accepted to increase the number of letters accepted by the user, wherein the number of letters accepted is less than a number of letters in the word, and to cause redetermination of the one or more sequences of letters based on the letters accepted.

28. The method of claim 27, wherein the reduced keypad is a numeric keypad.

29. The method of claim 27, further initially comprising, for each word in a cache that is consistent with the key input, determining a probability of the word given the left context, and adding the word and the probability of the word to an array of word-probability pairs.

30. The method of claim 27, further comprising:

for each word in the vocabulary that is consistent with the key input as an initial part of the word, determining a probability of the word given the left context, and, upon determining that the probability is greater than a greatest probability so far determined, setting the greatest probability to the probability and a greatest probability word associated with the greatest probability to the word;

upon determining that the greatest probability is at least a number of times greater than a word of a first word-probability pair of the array of word probability-pairs, adding the greatest probability word associated with the greatest probability and the greatest probability a new first word-probability pair to the array.

31. The method of claim 27, further comprising:

finding one or more additional potential words from the dictionary, where each additional potential word has a cost between the entered key input and a prefix of a sequence corresponding to the potential word less than a maximum cost;

determining a probability of each potential additional word given the left context and taking into account a partial word penalty, and upon determining that the probability is greater than the greatest probability so far determined, setting the greatest probability to the probability of the potential additional word and the greatest probability word associated with the greatest probability to the potential additional word.

32. The method of claim 27, wherein the one or more sequences of letters are determined by using a letter language model.

33. The method of claim 31, wherein using the letter language model comprises using an n-gram letter model.

34. The method of claim 27, wherein the method is performed by execution of a computer program by a processor from a computer-readable medium.

35. An apparatus comprising:

a plurality of keys of a reduced keypad, each of one or more of the keys mapped to a plurality of letters, the plurality of keys used to enter key input corresponding to a word using a single-tap approach in which one of the keys mapped to a plurality of letters is pressed only once for each letter, the key input having at least one of a left context and a right context; and, a word-determining logic designed to determine one or more sequences of letters as the word and to present the one or more sequences of letters, where a user selects the word corresponding to the key input from the one or more sequences of letters without resorting to a multiple-tap approach in which one of the keys mapped to a plurality of letters is pressed at least once for each letter, and where the user can indicate without resorting to the multiple-tap approach an accepted one or more initial letters of the word from the one or more sequences, the one or more initial letters having less letters than the word, to cause redetermination of the one or more sequences of letters presented as a function of the accepted one or more initial letters.

36. The apparatus of claim 35, wherein the reduced keypad is a numeric keypad.

37. The apparatus of claim 35, further comprising a spell-checking logic designed to provide potential alternative words for the word corresponding to the key input entered, where the word is misspelled, taking into account that the word was entered using the plurality of keys, as opposed to a keyboard having a unique key for each of the plurality of letters.

38. The apparatus of claim 37, wherein the spell-checking logic is further to determine one or more potential words to the word where the word is not found in a dictionary of words, by at least finding the one or more potential words from the dictionary, each potential word having a cost between the key input and a sequence corresponding to the potential word less than a maximum cost.

39. The apparatus of claim 35, wherein the word-determining logic is further designed to determine the word corresponding to the key input by using a machine learning approach based on one or more of the at least one of the left context and the right context of the key input.

40. The apparatus of claim 39, wherein the spell-checking logic is part of the word-determining logic.

41. The apparatus of claim 35, wherein the apparatus is a telephone.

42. The apparatus of claim 41, wherein the apparatus is a mobile telephone.

43. The apparatus of claim 41, wherein the apparatus is one of: a cellular telephone, a corded telephone, a cordless telephone, a digital telephone, and a radio telephone.

44. The apparatus of claim 35, wherein the apparatus is one of: a pager, a desktop computer, a laptop computer, a handheld device, a personal-digital assistance (PDA) device, and a remote control device.

45. The apparatus of claim 35, wherein the word-determining logic comprises a computer program stored on a computer-readable medium for execution by a processor.

* * * * *